US010382295B2

(12) United States Patent
Barry et al.

(10) Patent No.: US 10,382,295 B2
(45) Date of Patent: Aug. 13, 2019

(54) METADATA CORRELATION AND DISAMBIGUATION

(71) Applicant: LUMINOUS CYBER CORPORATION, San Jose, CA (US)

(72) Inventors: Charles F. Barry, Santa Clara, CA (US); Sumanta Saha, Freemont, CA (US)

(73) Assignee: LUMINOUS CYBER CORPORATION, San Jose, CA (US)

(*) Notice: Subject to any disclaimer, the term of this patent is extended or adjusted under 35 U.S.C. 154(b) by 298 days.

(21) Appl. No.: 15/073,239

(22) Filed: Mar. 17, 2016

(65) Prior Publication Data
US 2016/0197832 A1 Jul. 7, 2016

Related U.S. Application Data

(63) Continuation of application No. 15/022,665, filed as application No. PCT/US2014/056129 on Sep. 17, 2014.

(Continued)

(51) Int. Cl.
*H04L 12/743* (2013.01)
*H04L 12/26* (2006.01)
(Continued)

(52) U.S. Cl.
CPC ............ *H04L 43/04* (2013.01); *H04L 41/147* (2013.01); *H04L 41/22* (2013.01); *H04L 43/045* (2013.01);
(Continued)

(58) Field of Classification Search
CPC ... G06F 15/16; H04L 12/743; H04L 45/7453; H04L 51/38; H04W 8/00; H04W 40/04
See application file for complete search history.

(56) References Cited

U.S. PATENT DOCUMENTS 7,818,402 B1* 10/2010 Zhang ................. H04L 61/1582
709/219
7,937,362 B1* 5/2011 Lian ....................... G06Q 10/00
707/622

(Continued)

FOREIGN PATENT DOCUMENTS

EP 2487599 A1 8/2012

OTHER PUBLICATIONS

International Search Report and Written Opinion for PCT/US2014/056129 dated Dec. 16, 2014 (24 pages).

*Primary Examiner* — Zhiren Qin
(74) *Attorney, Agent, or Firm* — Kramer Amado, P.C.

(57) ABSTRACT

Methods, systems, and apparatus for network monitoring and analytics are disclosed. The methods, systems, and apparatus for network monitoring and analytics perform highly probable identification of related messages using one or more sparse hash function sets. Highly probable identification of related messages enables a network monitoring and analytics system to trace the trajectory of a message traversing the network and measure the delay for the message between observation points. The sparse hash function value, or identity, enables a network monitoring and analytics system to identify the transit path, transit time, entry point, exit point, and/or other information about individual packets and to identify bottlenecks, broken paths, lost data, and other network analytics by aggregating individual message data.

18 Claims, 15 Drawing Sheets

Related U.S. Application Data

(60) Provisional application No. 61/879,186, filed on Sep. 18, 2013, provisional application No. 61/879,188, filed on Sep. 18, 2013, provisional application No. 61/879,192, filed on Sep. 18, 2013.

(51) Int. Cl.
*H04L 12/24* (2006.01)
*H04W 40/04* (2009.01)
*H04L 12/58* (2006.01)

(52) U.S. Cl.
CPC ............ *H04L 43/06* (2013.01); *H04L 43/08* (2013.01); *H04L 45/7453* (2013.01); *H04W 40/04* (2013.01); *H04L 51/12* (2013.01)

(56) References Cited

U.S. PATENT DOCUMENTS

| | | | |
|---|---|---|---|
| 8,619,579 B1* | 12/2013 | Rothstein | H04L 43/026 370/235 |
| 2006/0190493 A1* | 8/2006 | Kawai | G06Q 10/107 |
| 2008/0260059 A1* | 10/2008 | Pan | H04B 7/0417 375/260 |
| 2010/0312810 A1* | 12/2010 | Horton | G06F 21/10 707/812 |
| 2011/0055386 A1 | 3/2011 | Middleton et al. | |
| 2011/0289207 A1 | 11/2011 | Liu et al. | |
| 2012/0324029 A1* | 12/2012 | Fogel | H04L 51/38 709/206 |
| 2013/0022046 A1* | 1/2013 | Vasseur | H04L 45/7453 370/392 |
| 2013/0091270 A1 | 4/2013 | Zhang et al. | |
| 2014/0280839 A1* | 9/2014 | Agrawal | H04L 61/2514 709/223 |

\* cited by examiner

METADATA CORRELATION AND DISAMBIGUATION

CROSS REFERENCE TO RELATED APPLICATIONS

The present application is a continuation of U.S. patent application Ser. No. 15/022,665, entitled "HIGHLY PROBABLE IDENTIFICATION OF RELATED MESSAGES USING SPARSE HASH FUNCTION SETS", filed Mar. 17, 2016, which application is a U.S. national phase application filed under 35 U.S.C. 371 of International Patent Application No. PCT/US2014/056129, entitled "HIGHLY PROBABLE IDENTIFICATION OF RELATED MESSAGES USING SPARSE HASH FUNCTION SETS", filed Sep. 17, 2014, which application is related to and claims priority to U.S. Patent Appl. No. 61/879,186, entitled "HIGHLY PROBABLE IDENTIFICATION OF RELATED MESSAGES USING SPARSE HASH FUNCTION SETS", filed Sep. 18, 2013, U.S. Patent Appl. No. 61/879,188, entitled "METADATA CORRELATION AND DISAMBIGUATION", filed Sep. 18, 2013, and U.S. Patent Appl. No. 61/879,192, entitled "EXPLORATIVE VISUALIZATION OF COMPLEX NETWORKS IN CONSTRAINED SPACES", filed Sep. 18, 2013, the disclosure of each of which is incorporated by reference herein in their entireties.

INTRODUCTION

Wired and wireless networks comprise complex graphs with non-trivial topological features. Patterns of connections between network elements, as well as the state of the elements, are neither purely random nor purely regular. In addition, the complexity increases drastically when networks of networks are introduced. For organizations with mission-critical networks, for example, mobile networks or financial trading networks, the inability to quickly and accurately assess the quality or performance of their respective networks, quickly determine the root causes of challenges, and intelligently optimize infrastructure, costs the organizations millions of dollars.

Network and datacenter service providers have a fundamental need to provide fast, reliable network services to their customers. Network and datacenter services typically must meet or exceed an agreed upon level of service quality, which may be defined in one or more Service Level Agreements (SLAs). The network and datacenter service providers are required to provide proof that their services are meeting the terms of the SLA in the form of key performance indicators (KPIs). SLAs and KPIs typically include, but are not limited to, specific requirements for connectivity, delay, jitter, throughput, uptime, mean time to repair (MTTR), and mean opinion score (MOS).

Current systems and methods are inadequate for providing comprehensive monitoring and analytics of KPIs. Current techniques include monitoring equipment or software coupled to the network, manual or automated network audits, or sampling of a short time period, a small portion of a network, or a small portion of the traffic in a network. Prior techniques are not scalable and are not equipped to respond as networks add additional elements, become distributed or virtualized, and cannot respond to demand increases for greater bandwidth with real-time latency.

Traditional methods of visualizing networks are inadequate for providing real-time monitoring and analytics of networks. Traditional methods, such as heat maps and other hierarchical displays, require large amounts of space to adequately display a network. If the visualization is constrained to a small amount of space, such as a computer monitor, then only a small portion of the visualization can be displayed and the user loses critical insight due to a loss of information.

SUMMARY

In various embodiments, computer-implemented methods and systems are disclosed. In one embodiment, the computer-implemented method comprises calculating, by a processor, a hash value for a first message at a plurality of observation points on a network using a first hash function. The hash value is calculated for the invariant fields of the message. The computer-implemented method further comprises associating, by the processor, metadata with the hash value of the first message; tracking, by the processor, the transit of the first message over the network; and generating, by the processor, one or more network analytics for the first message over the network. The one or more network analytics are generated from the associated metadata.

In various embodiments, computer-implemented methods and systems are disclosed. In one embodiment, a computer-implemented method comprises receiving, by a processor, a plurality of metadata packets corresponding to a plurality of messages. Each of the metadata packets comprises a sparse hash value. The computer-implemented method further comprises identifying, by the processor, a plurality of matching sparse hash values. The plurality of matching sparse hash values correspond to at least a first message and a second message. The computer-implemented method further comprises disambiguating, by the processor, the first message and the second message. The first message and the second message are disambiguated using the metadata associated with the plurality of sparse hash values.

FIGURES

The novel features of the embodiments described herein are set forth with particularity in the appended claims. The embodiments, however, both as to organization and methods of operation may be better understood by reference to the following description, taken in conjunction with the accompanying drawings as follows.

DESCRIPTION

Figure 1:
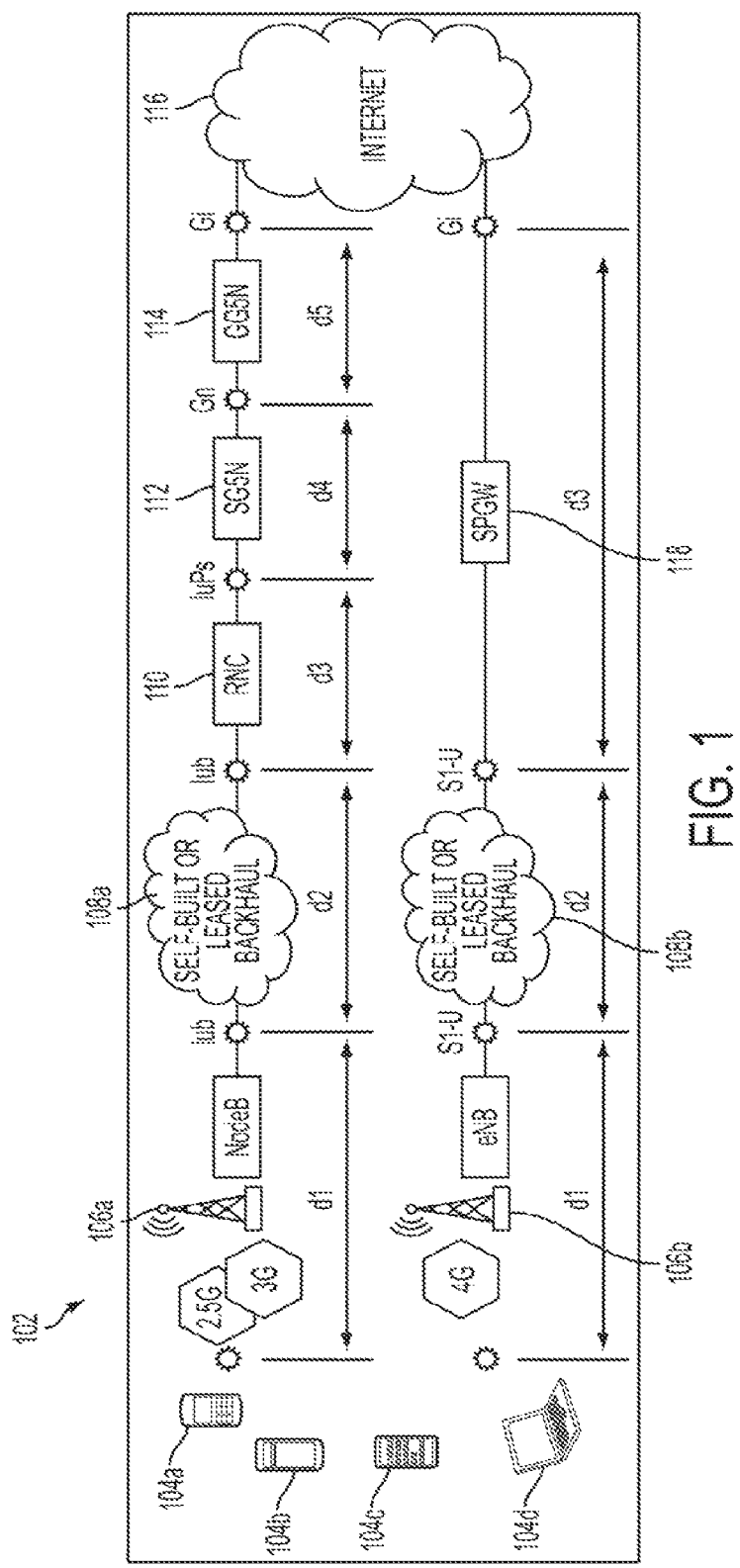
FIG. 1 illustrates one embodiment of a network topology.

Reference will now be made in detail to several embodiments, including embodiments showing example implementations of systems and methods for network monitoring and analytics. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

In various embodiments, methods, systems, and apparatus for network monitoring and analytics are disclosed. In some embodiments, the systems and methods for network monitoring and analytics comprise highly probable identification of related messages using one or more sparse hash function sets. In some embodiments, the systems and methods for network monitoring and analytics comprise metadata correlation and disambiguation. In some embodiments, a network visualization display is disclosed.

In various embodiments, systems and methods for network monitoring and analytics are disclosed. The network monitoring and analytics system is scalable to monitor and track the transit of up to every message and every node across a distributed network, for example, a nationwide distributed network. The network monitoring and analytics system is further scalable to monitor every message communication process in, among, and between virtual and/or physical servers, switches, and routers in, among, and between datacenters. Statistics are collected based on the message transits including, but not limited to, message size, message type, message source(s) and/or originator(s), destination(s), delay per observation point pair, loss, locations between which the loss occurred, and transit topology.

In some embodiments, the systems and methods for network monitoring and analytics perform highly probable identification of related messages using one or more sparse hash function sets. Highly probable identification of related messages enables a network monitoring and analytics system to trace the trajectory of a message traversing the network and measure the delay for the message between observation points. Statistics are developed for individual messages and/or ensembles of messages. The sparse hash function value, or identity, enables a network monitoring and analytics system to identify the transit path, transit time, entry point, exit point, and/or other information about individual packets and to identify bottlenecks, broken paths, lost data, and other network analytics by aggregating individual message data. In various embodiments, the sparse hash function is calculated for one or more invariant fields of a message. The invariant fields used for the hash function calculation may depend, for example, on the protocol, message type, network type, and/or other parameters of the message and/or network.

In some embodiments, the systems and methods for network monitoring and analytics comprise metadata collection. The collected metadata is used for network analysis and hash value disambiguation. The metadata collected for a message is associated with the message within the network. The metadata is used to disambiguate two or more messages comprising the same hash value.

In some embodiments, the systems and methods for network monitoring and analytics comprise a network visualization display. The network visualization display provides visualization of network states, flows, and relationships between nodes of a network. In some embodiments, the network visualization display comprises a chord diagram. The chord diagram comprises a plurality of nodes and one or more chords connecting at least a subset of the plurality of nodes. The network visualization display provides network operators with real-time, easy to interpret information regarding network utilization and functionality.

In various embodiments, the network monitoring and analytics systems and methods are configured to provide visual indicators that allow a user to, at-a-glance, quickly understand large-scale, distributed and complex networks, including the states of the network elements, the flows between the network elements, the relationships amongst the network elements, and the problems that are occurring in real-time. Mission-critical networks can scale to hundreds of terabits per second. In various embodiments, the network monitoring and analytics system comprises a visual display. The visual display is configured to provide visualization of network statistics in a format configured for fast identification of flows, errors, and/or other network information. In some embodiments, the visual display comprises a chord diagram.

In various embodiments, a message comprises a collection of bits and/or bytes that represent information that is to be transported between two or more locations. A message may be a file, a portion of a file, a protocol message, and/or any other type of message on the network, that is stored on a storage medium and/or that is in flight (in transit) in a network. In some embodiments, a message comprises a service data unit (SDU), a protocol data unit (PDU), a datagram, a packet, a frame and/or a cell. Those skilled in the art will recognize that a message may comprise any digital bits and/or bytes transmitted over a network and is not limited to only those messages and/or protocols discussed herein. A message may originate on, terminate on, and/or pass through the network.

When transmitted over a network, a message may be transmitted within and/or as a single packet (including, but not limited to, the network standard definitions of packet, frame or cell), within a fraction of a packet, distributed across multiple packets that may traverse different paths, and/or may be fragmented into multiple packets. Messages may be unicast, multicast or broadcast to a number of destinations and potentially replicated by network elements. A packet may be encapsulated in one or more additional packets generated during transit of the message over the network.

Sparse Hash Function Calculation

FIG. 1 illustrates one embodiment of a network topology 102. The network topology 102 comprises a mobile service provider network. Although a mobile service provider network is illustrated, the network topology 102 is provided merely as an illustration, and is not intended to be limiting. Those skilled in the art will recognize that the network topology 102 is illustrative of a typical network and the same principles will apply to other network topologies. The network 102 comprises a plurality of user devices 104a-104d. The plurality of user devices 104a-104d are configured to transmit and/or receive messages over the network 102.

In one embodiment, a user device 104a generates a message to be transmitted over the network 102. The user device 104a transmits the message to a base station 106a, 106b coupled to the network 102. Although a wireless transmission is illustrated, the user devices 104a-104d may be coupled to the service provider network 102 through wired and/or wireless connections. The base station 106a, 106b receives the message and retransmits the message to a backhaul network 108a, 108b. The time between the message being received at the base station 106a, 106b to the time that the message is transmitted from the base station 106a, 106b to the backhaul network 108a, 108b comprises a first transit time d1. The message traverses the backhaul network 108a, 108b and is transmitted from the backhaul network 108a, 108b to one or more network components. For example, in one embodiment, the message is transmitted to a radio network controller (RNC) 110. The time between the message being received by the backhaul network 108a and being received at the network component comprises a second transit time d2.

A network component may process, transform, and/or otherwise alter the message and transmit the message to one or more additional network components. For example, the RNC 110 processes the message and transmits the message to a serving GPRS (general packet radio service) support node (SGSN) 112. The time between receipt of the message at the RNC 110 and receipt of the message at the SGSN 112 comprises a third transit time d3. The SGSN 112 processes the message and transmits the message to a gateway GPRS support node (GGSN) 114. The time between receipt of the message at the SGSN 112 and receipt of the message at the GGSN 114 comprises a fourth transit time d4. The GGSN processes the message and transmits the message to a network outside of the mobile service provider network 102, for example, to the internet 116. The time between receipt of the message at the GGSN 114 and the message exits the network comprises a fifth transit time d5. The sum of the transit times d1, d2, d3, d4, and d5 comprises the total transit time for the message on the network 102.

In some embodiments, one or more network components may be substituted for one or more other network components. For example, the RNC 110, the SGSN 112, and the GGSN 114 may be replaced by a single serving gateway/PDN gateway (SPGW) 118. The SPGW 118 may process the message and perform each of the functions of the RNC 110, SGSN 112, and GGSN 114 in a single device. A single transit time may be calculated from the time a message is transmitted to the SPGW 118 to the time the SPGW 118 transmits the message outside of the network 102. In some embodiments, one or more of the network components, such as, for example, the RNC 110, the SGSN 112, the GGSN 114, or the SPGW 118 modify a message and/or a packet encapsulating the message. Network owners may be interested in the individual transit times between network elements, the aggregate transit time of a message over the network, and/or additional message information.

Figure 2:
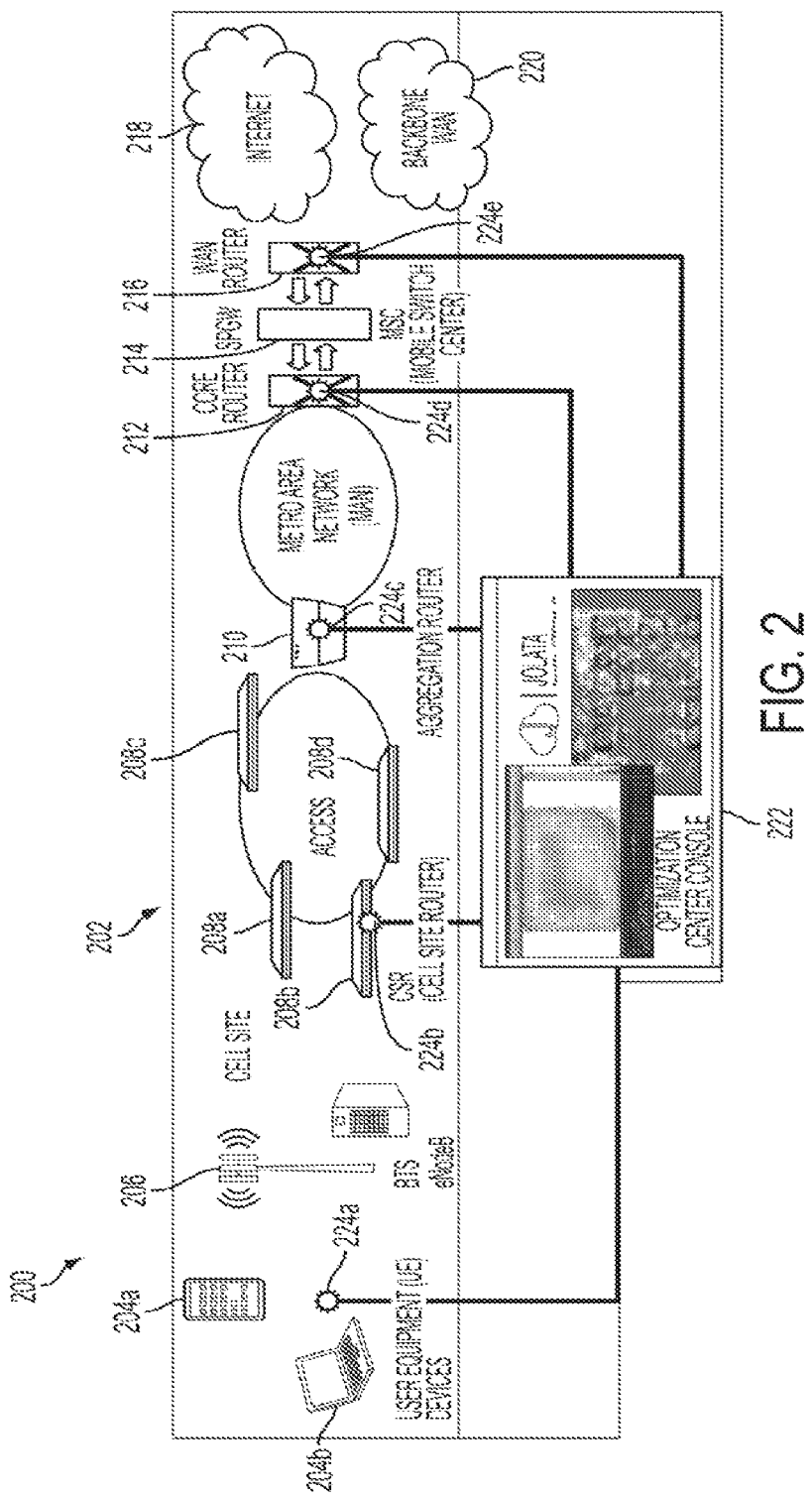
FIG. 2 illustrates one embodiment of a network topology comprising an integrated network monitoring and analytics system.

FIG. 2 illustrates one embodiment of a real-time network performance monitoring system 200. The real-time network performance monitoring system 200 comprises a network 202. The network 202 may comprise, for example, a mobile provider network, a datacenter provider network, and/or any other network. The network 202 comprises a plurality of user devices 204a, 204b. The plurality of user devices 204a, 204b are configured to transmit and/or receive messages over the network 202. The plurality of user devices 204a, 204b are coupled to a Base Transceiver Station evolved Node B (BTS eNodeB) 206. In one embodiment, a message is transmitted from a user device 204a to the BTS eNodeB 206. The BTS eNodeB 206 is coupled to one or more cell site routers (CSRs) 208a-208d. An aggregation router 210 couples the CSRs 208a-208d to a metro area network (MAN). The MAN couples the CSRs 208-208d to a core router 212, a SPGW 214, and a wide-area network (WAN) router 216. The WAN router 216 couples the local network 202 to one or more additional networks, such as, for example, the Internet 218 and/or a backbone WAN 220.

A network monitoring and analytics system 222 is integrated with the network 202. The network monitoring and analytics system 222 is configured to monitor messages traversing the network 202 and to determine transit times, transit paths, source, destination, length, and/or other network analytic information for each message traversing the network. The network monitoring and analytics system 222 generates a sparse hash function value for each message traversing the network. The spare hash function value provides highly probable identification of related messages. The network monitoring and analytics system 222 comprises a plurality of observation points 224a-224e. Each observation point 224a-224e is monitored and the sparse hash function value for each of the messages passing through the observation points 224a-224e is recorded. Network analytics data is generated by comparing message information at each of the observation points 224a-224e. In some embodiments, the network monitoring and analytics system 222 provides end-to-end and/or node-to-node monitoring of delay, jitter, throughput, and loss. The network monitoring and analytics system 222 is embedded into the network elements and user equipment and eliminates the need for additional, external probes.

In some embodiments, the network monitoring and analytics system 222 generates metadata for up to every packet at every observation point 224a-224e within the network 202. The metadata may be monitored, filtered, and provided to an analytics engine of the network monitoring and analytics system 222. The metadata is aggregated, correlated, and analyzed by the network monitoring and analytics system 222, for example, by a Mobile Switch Center (MSC). In some embodiments, the generated metadata is used for disambiguation of messages having the same sparse hash function value.

The network monitoring and analytics system 222 provides link, segment, and path statistics from each of the user devices 204a, 204b to the network core and provides upstream, downstream, one-way, and/or round-trip analysis. A heat map may be generated for visualization of the network 202 and/or the messages traversing the network 202. In some embodiments, the network monitoring and analytics system 222 provides threshold crossing alerts and allows flexible queries to analyze statistics per node, hop, equipment type, geography, protocol, subscriber, time of day, and/or other parameters. In some embodiments, the network monitoring and analytics engine 222 provides wire speed processing rates of up to, for example, 2×100 GbE per analytics appliance with an effective traffic analysis of, for example, 800 Gbps.

In some embodiments, the network monitoring and analytics system 222 utilizes sparse hash function sets to generate unique identifiers for each packet and/or message within a network 202. A hash function comprises an algorithm that maps data of variable length, for example, a message, to data of a fixed length. In some embodiments, the hash function value is smaller than the message. A message typically contains static, or invariant, information that is to be transported over the network and dynamic, or variant, information that is changed, or modified, as the message traverses the network. The portions of the message that change comprise variant fields and the portions of the message that do not change comprise invariant fields. One or more variant fields may be modified in well-known ways as the message is transported in the network. In some embodiments, the one or more variant fields modified in well-known ways are mapped to an invariant value that is used in the hash function. For example, in one embodiment, the well-known variant fields are mapped to a constant value in the hash function.

Fields may comprise individual bits and/or collections of bits, such as, for example, eight bits (a byte). Messages may comprise fixed or variable length, in that the length of the message itself may be modified as the packet traverses the network. Different messages may comprise fixed and/or variable lengths. For example, one message may comprise a fixed length of 64 bytes and another message may comprise a fixed length of 1044 bytes, or any length allowed on the network or in the definition of the message. The length of the message may vary, for example, depending on the protocol used to transport the message over the network 202.

In some embodiments, the sparse hash function may be implemented in hardware, software, or a combination thereof. For example, in various embodiments, the sparse hash function may be implemented in hardware as an application specific integrated circuit (ASIC), a field programmable gate array (FPGA), and/or other specialized hardware. In some embodiments a sparse hash function may be implemented in software configured to be executed by a central processing unit (CPU), graphical processing unit (GPU), or other general purpose processor. In some embodiments, the sparse hash function may comprise both hardware and software portions.

In various embodiments, the sparse hash function provides a unique identity, or thumbprint, for each packet that enters the network. For example, in one embodiment, a network may comprise four observation points. A packet enters the network at a first observation point, or a first node. The sparse hash function generates a hash value for the packet and associates the generated hash value with, for example, metadata associated with the packet. As the packet traverses the network, the packet is identifiable at each node by the hash value identity generated for the packet. For example, if the packet travels from the first node to a second node, the hash value for the packet is calculated at the second node and identifies the packet as the packet that entered the network at the first node. By identifying the packet at each node, the path of the packet through the network can be identified by aggregating each node through which the packet passes. In various embodiments, the sparse hash function allows the network monitoring and analytics system to monitor up to every packet passing through a distributed network.

In various embodiments, metadata may be associated with the hash value generated for a packet. Packet metadata comprises one or more fields configured to provide a description of the packet. Packet metadata is used to perform network analysis and aggregation without needing to transmit or analyze an entire packet. In some embodiments, the hash value and metadata for each packet is provided to a network analytics system. The network analytics system identifies packets comprising matching hash values and analyzes the packet's trajectory through the network based on metadata associated with the hash value. Associated metadata may comprise, for example, the size of the packet, time of transmission, trajectory through the network, the source of the packet, the destination of the packet, type of packet, and/or additional packet metadata. In some embodiments, the metadata information stored for each packet comprises a fraction of the size of the packet. By providing a compact representation of each packet on the network, the metadata and sparse hash function allow monitoring and analysis of up to every packet on a network.

Figure 3:
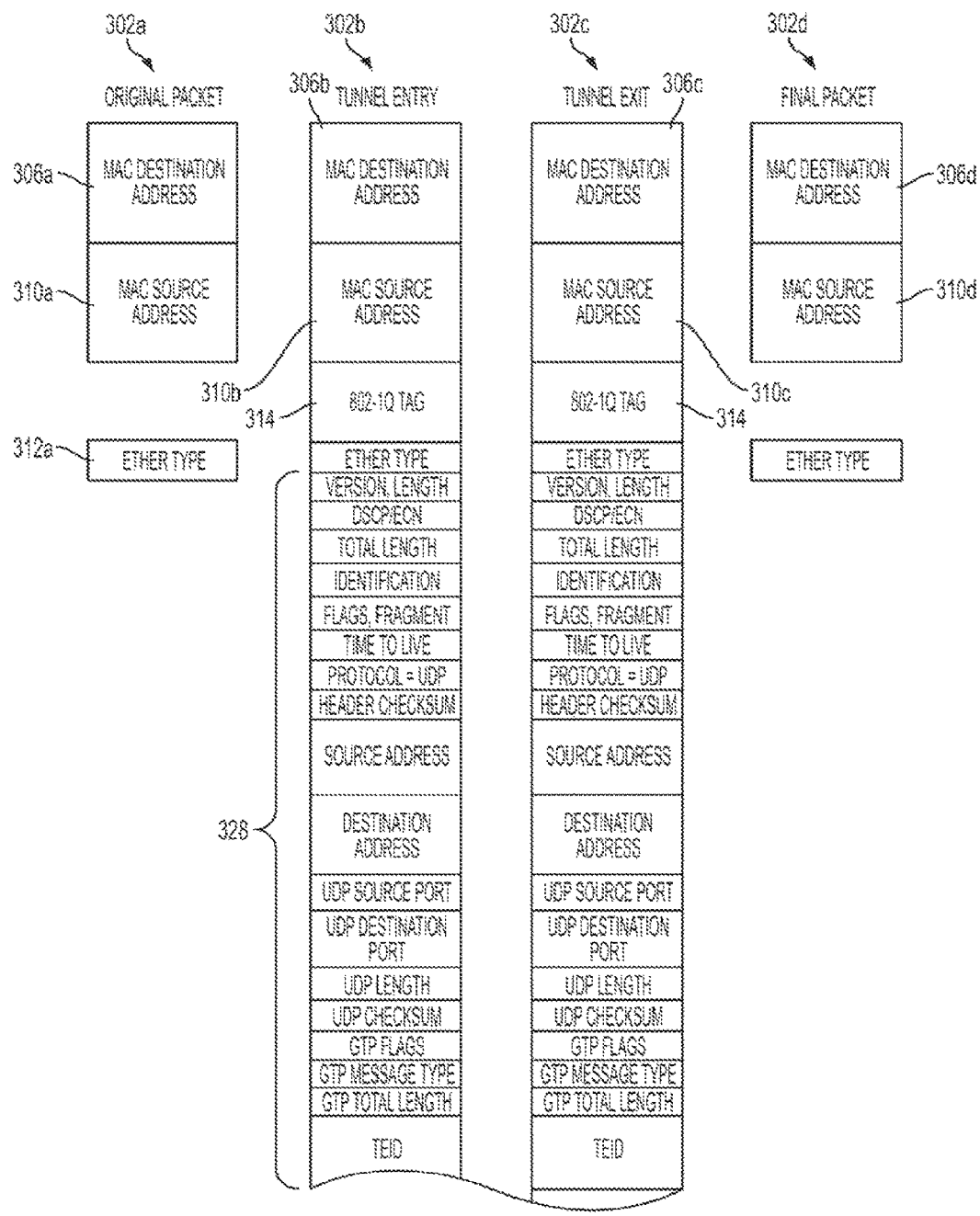
FIG. 3 illustrates one embodiment of an IPv4 packet during transit of a network.
Figure 3:
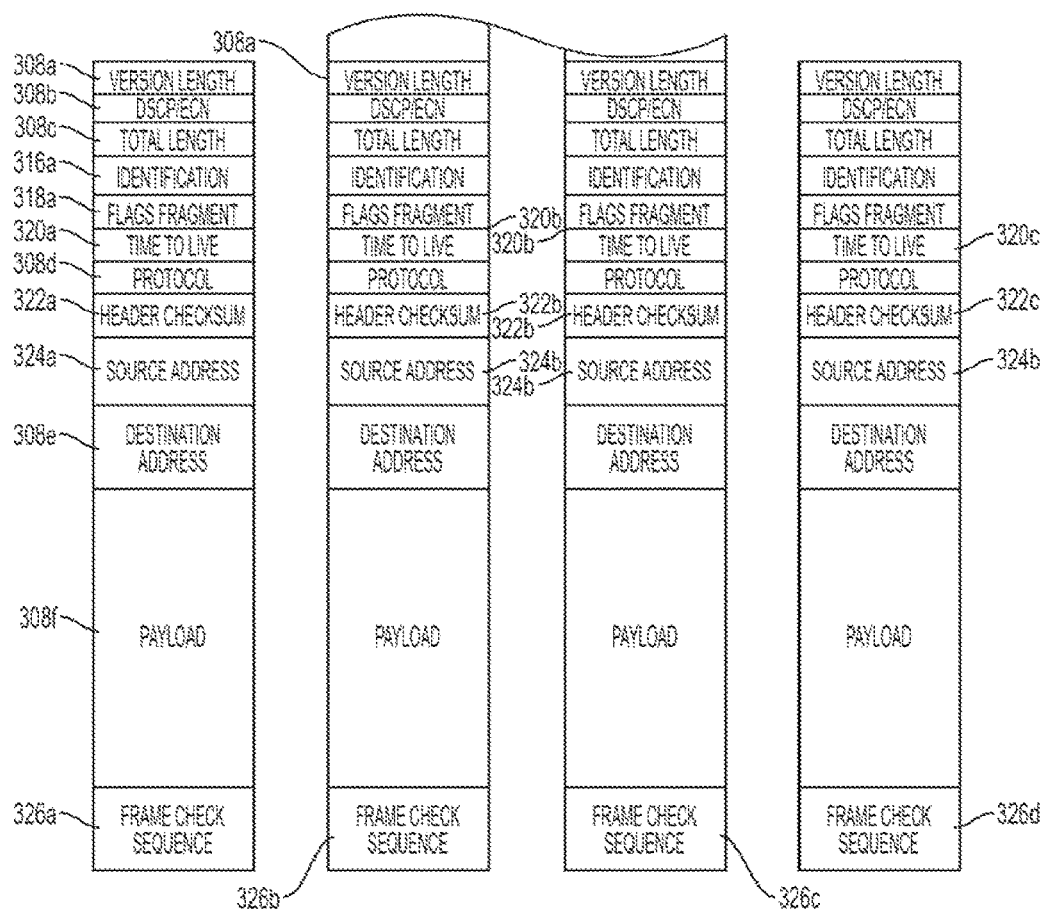

FIG. 3 illustrates a message 302a sent as an Internet Protocol version 4 (IPv4) packet transported over an IEEE 802.2 Ethernet frame. Although an IPv4 packet is illustrated, those skilled in the art will recognize that any protocol, frame, cell, and/or combination thereof may be used with the present disclosure. The message 302a is observed at four observation points as it traverses a network. The original message 302a comprises a plurality of variant and invariant fields. The variant fields of the message 302a comprise, for example, a media access control (MAC) Destination Address 306a, a MAC Source Address 310a, an ether type 312a, a packet identification 316a, one or more flags 318a, a header checksum 322a, a source address 324a, and/or a frame check sequence 326a. In embodiments including protocols other than IPv4, the variant fields of the message may include additional, fewer, and/or alternative variant fields. The original message 302a comprises a plurality of invariant fields 308a-308f, such as, for example, a version length field 308a, a differentiated services code point/explicit congestion notification (DSCP/ECN) field 308b, a total length field 308c, a protocol field 308d, a destination address field 308e, and/or a payload field 308f. In embodiments including protocols other than IPv4, the invariant fields of the message may include additional, fewer, and/or alternative invariant fields.

As the message 302a (or packet) traverses the network, the message 302a may be transformed by one or more network components and/or protocols. For example, in the illustrated embodiment, the message 302a is transformed by Network Address Translation (NAT), entry to a General Packet Radio Service (GPRS) Tunneling Protocol (GTP) tunnel, exit from the GTP tunnel, and subsequent handoff to the internet. The originating message 302a is shown on the left. Upon entry to the GTP Tunnel, the message 302a is tagged with an IEEE 802.1Q Virtual Local Area Network (VLAN) tag and encapsulated within an IPv4 packet 302b as a User Datagram Protocol (UDP) datagram that is a GTP message containing the original message 302a. Encapsulation of the message within an IPv4 packet adds additional variant fields 328 to the message 302b. Some fields of the original message 302a are changed due to NAT including the original message's IP Source Address 324b, identification 316a, flags 318a, Time To Live (TTL) field 320b and IP Header Checksum 326b. The Ethernet MAC Source 310a-310d and Destination Addresses 306a-306d are changed by the traversal of routers and the Frame Check Sequence (FCS) has been recalculated.

Despite the many modifications to variant fields of the original message 302a, the invariant fields 308a-308f remain unchanged. The invariant fields 308a-308f are shown as unshaded in the four packets 302a-302d. As the message 302a transits routers and traverses the path of the GTP tunnel, the Ethernet MAC Source 310b, 310c and Destination addresses 306b, 306c and FCS 326b, 326c are changed as is the Encapsulating IPv4 TTL 320b and Header Checksum 322b. The invariant fields of the original message 302a are not modified within the GTP tunnel. When the message 320c exits the GTP tunnel, the message 320c is again transformed for its delivery to the internet by removing the GTP, UDP and IPV4 encapsulations and VLAN tag. The Ethernet MAC Source Address 310c, Destination Address 306c and FCS 326c of the message 302b, 302c are changed as appropriate. The original message's 302a TTL 320a is decremented and its Header Checksum 326a is recomputed. The fields that are unshaded in the final packet 302d are those fields that are invariant across the entire transit path. In one embodiment, the invariant fields, or a subset thereof, are utilized to calculate a sparse hash function value for the message.

In various embodiments, the invariant fields 308a-308f are defined by the network protocols that act on the message at the various switches and routers along the message's path. In the illustrated embodiment, the fields are shown with the width representing one byte and the height representing the number of bytes. In other embodiments, fields may be any number of bits and/or collections of bits and need not be contiguous nor adjacent and are not constrained to integer byte sizes. For instance, fields, or sub-fields, in the IPV4 packet comprise 4 bits (Version, IP Header Length (IHL)), 3 bits (Explicit Congestion Notification (ECN), Flags), 5 bits (Differentiated Services Code Point (DSCP)) and 13 bits (Fragment Offset). Encapsulations may vary in size. For example, IPv4 supports an optional field of up to 40 additional bytes in the packet header.

Traversal through NAT can modify a number of fields of the original message 302a and is protocol dependent. For instance, the original message 302a comprises a UDP datagram. The original message's UDP source port and UDP Header Checksum may be modified by NAT. Other protocols, such as, for example, TCP or ICMP, have different header lengths and different fields that may be modified by NAT. Certain applications and/or protocols, such as, for example, File Transfer Protocol (FTP), comprise fields that may not be encoded as fixed length binary, but as variable length character strings encoded as American Standard Code for Information Interchange (ASCII) bytes. The characters of the strings, as well as the length of the strings, may be changed by NAT. The location of one or more fields within a packet may be moved by NAT, including variant and invariant fields.

In some embodiments, a packet may be fragmented as the packet transits the network. If a first fragment is greater than the size of the maximal size of the fields of the packet that are used for the hash, the hash is computed over the first fragment. If a fragmented packet is partially or wholly less than the number of bytes used for the hash function, a plurality of fragments are used until the hash is complete. Fragments may be discarded if the end or intermediate fragments are missing and/or do not arrive within a maximal accepted time.

Figure 4:
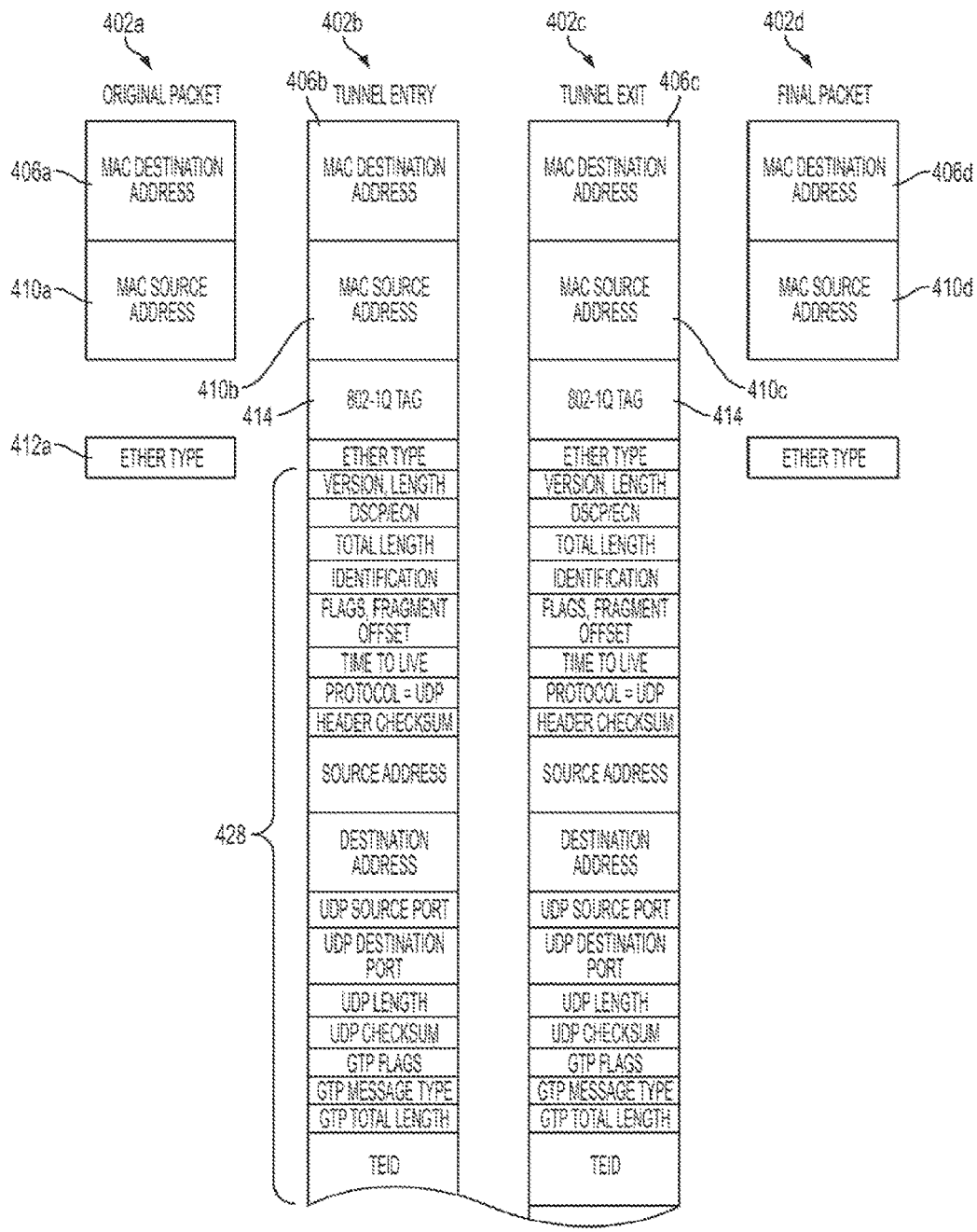
FIG. 4 illustrates one embodiment of an IPv4 packet during transit of a network comprising an invariant source address.
Figure 4:
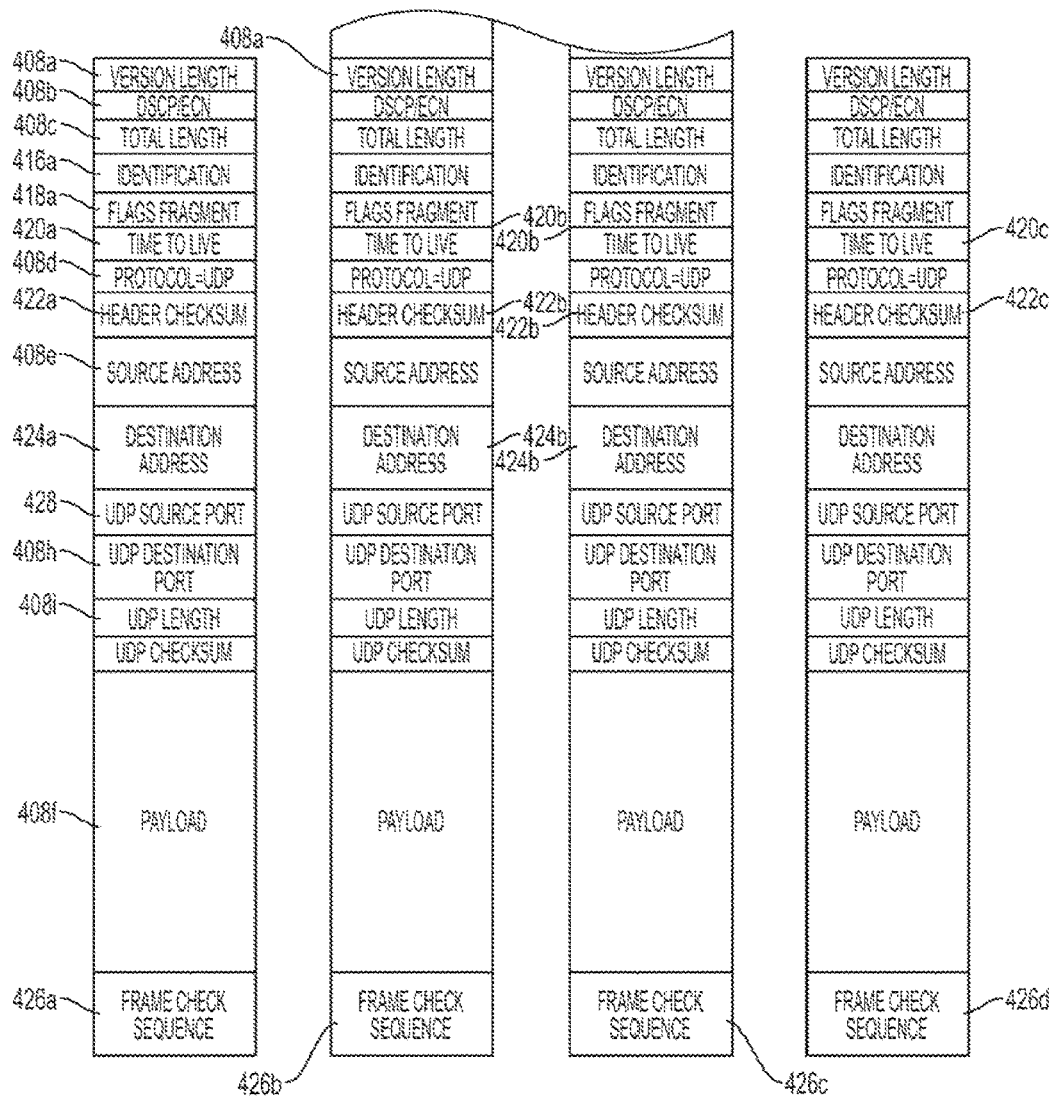

In some embodiments, the network monitoring and analytics system comprises a functional block. The functional block determines the existence and location of the original fields of message. The functional block may utilize knowledge of the functional blocks location and/or algorithmic calculations to determine the existence and location of the original fields of the message. For example, in one embodiment, a packet is scanned for a VLAN tag, IPV4, UDP and GTP encapsulations returning an offset pointing to the original message. In embodiments comprising variable sized transformations, the function returns a list of pointers and lengths to the various invariant fields and/or block of fields. In many networks, packets entering the network from the outside, for example, the internet, will experience different transformations from those egressing the network. FIG. 4 illustrates the invariant fields for a packet 402a entering the network. For a packet 402a entering the network, the IPv4 source address 408e is invariant and the IPv4 Destination 424a is variant. In contrast, the invariant fields for a packet 302a entering the network comprise an invariant IPv4 destination address 308e and a variant IPv4 source address 324a, as illustrated in FIG. 3. A packet 402a entering the network undergoes similar processing and transformation as those discussed with respect to FIG. 3.

In some embodiments, the sparse hash function computes a hash over a subset of the invariant fields 308a-308f, 408a-408h, that are, in turn, a subset of the original message 302a, 402a. The choice of the subset is protocol (and application) dependent as determined by scanning of the packet and/or message. The sparse hash function acts upon only the invariant fields of the packet by eliminating (deleting or making constant) the various variant fields and may be limited, for example, to select only a subset of the invariant fields. The subset of the invariant fields selected may be protocol (and application) dependent. One or more fields may be excluded and/or limited to a certain number of bytes. The one or more fields that are excluded and/or ignored, and those which are utilized by the hash function, need not be contiguous.

The sparse hash function generates a hash value that is highly probable to be unique for the message that is hashed. It is not necessary that the entire message be hashed, for example, if the messages are likely to be of different lengths and/or contents. Generation of message hashes that are highly likely to be unique and that can be disambiguated by length, type, address, location, time frame, and/or other parameters, ensures highly probable identification of packets. Hash functions are typically costly in terms of gates (if implemented in hardware) and CPU cycles (if implemented in software). Reduction of the number of bytes in the hash results in a greater processing rate (messages hashed per second) and a reduction in the power required for the hash per message, allowing the network monitoring and analytics systems and methods to observe up to every message traversing a network.

Figure 5:
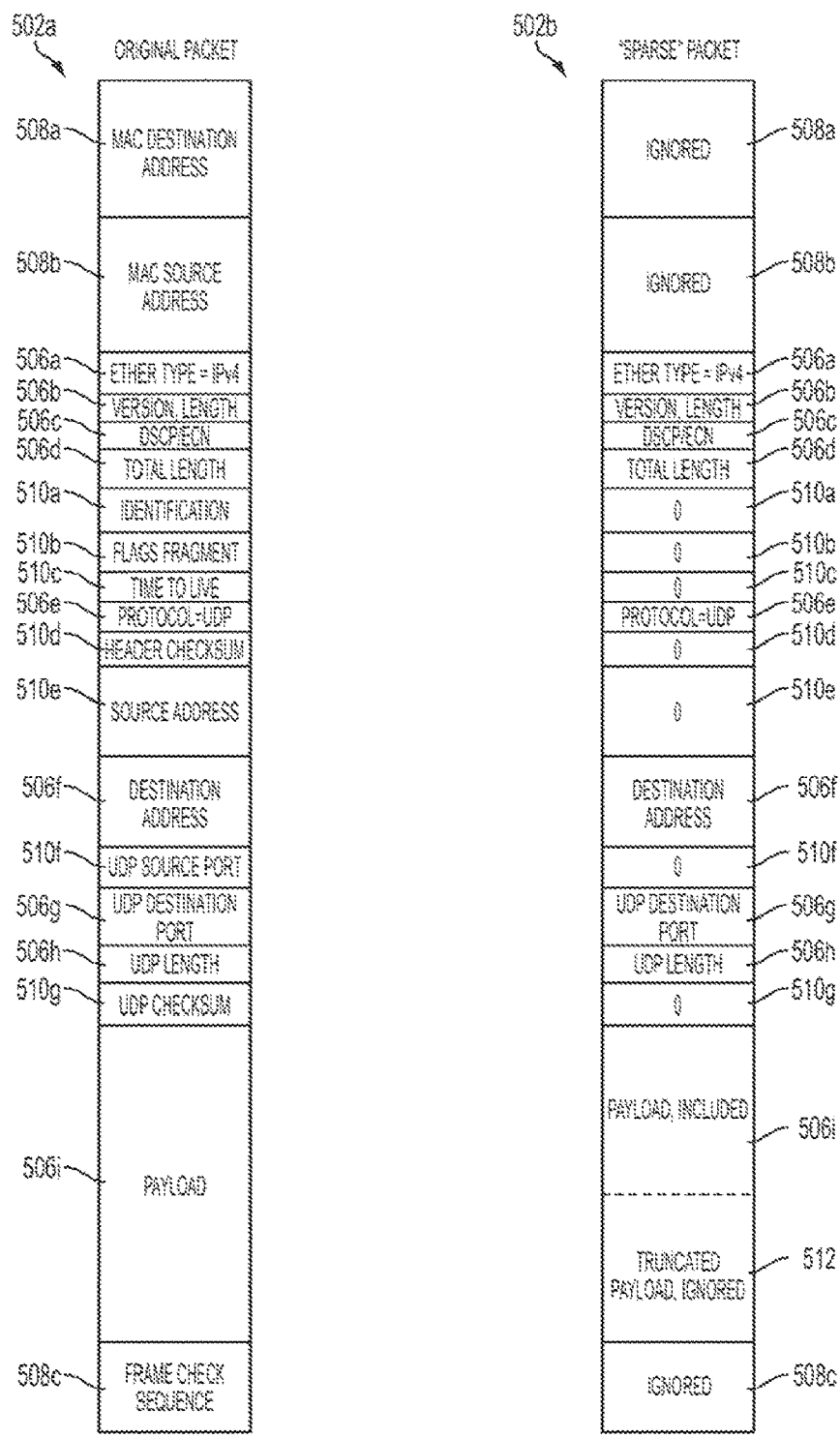
FIG. 5 illustrates one embodiment of sparse field handing of a packet by a hash function.

FIG. 5 illustrates one embodiment of the sparse hash function handling of one or more fields of a message 502a. The original packet 502a is shown on the left. The original packet 502a comprises a plurality of invariant fields 506a-506i and variant fields 508a-508c, 510a-510g. A sparse packet 502b comprises the original packet 502a as treated by the hash function, as shown on the right. The sparse packet 502b comprises the invariant fields 506a-506i of the original packet 502a. The invariant fields 506a-506g are generally unaltered in the sparse packet 502b. In some embodiments one or more invariant fields 506i may be truncated and part of the field ignored. A first subset of the variant fields 508a-508c are ignored by the hash function. A second subset of the variant fields 510a-510g are set to a constant value by the hash function.

In the illustrated embodiment, fields in the "sparse" packet that are shaded are ignored and fields that are unshaded are invariant fields 506a-506i and/or the second subset of variant fields 510a-510g that have been set to a constant value. For example, in the illustrated embodiment, each of the second subset of variant fields 510a-510g has been set to zero by the hash function. In some embodiments, setting the fields to zero as opposed to removing or ignoring the fields provides optimal memory and computation costs. One or more fields 508a, 508c at either end of the message 502b may be ignored for the computation and memory savings. The choice of ignoring or setting a field to a constant value is implementation dependent.

In some embodiments, the hash function is highly probable to be unique over the set of messages for which a hash is computed, is small enough in a number of bits so as to be compactly stored or communicated, and is easy to compute in hardware and/or software. There is a tradeoff between that uniqueness of the hash value and the length of the hash due to the known limitation of hash functions. For example, as the number of messages for which the hash is calculated increases, the chance that two unrelated messages will generate the same hash value also increase. The chance that two unrelated messages will generate the same hash value is higher for shorter hashes. This problem is referred to as the "birthday problem." When two different messages result in the same hash value, a collision occurs. The probability of collisions is dependent on the hash function and extremely sensitive to the number of messages to be hashed. In general, a longer hash will have fewer collisions for the same number of messages. But a longer hash is more costly to compute in terms of speed, gates, power, cycles and storage space. Whether the hash is 32 bits, 64 bits, 128 bits, 256 bits or some other size, it is necessary for the hash value to be the same for a given message at all points that are observed in order for that message to be identified as having traversed the observation points. In various embodiments, the hash may be different for different message types, applications, and/or networks. For instance, in one embodiment, a 256 bit hash is used for a first message type for which it is highly important that the hash values be unique over the message set and where there may be a very large number of messages. A 32 bit hash is used for a second message type that has a lower importance and/or a smaller number of expected messages.

In some embodiments, messages are associated with other messages for the purpose of aggregate (ensemble) statistics. Messages can be grouped by type and/or by classification. In some embodiments, messages are grouped temporally into a flow. Flow statistics are of especial importance as they are indicative of throughput and variation of delay, or jitter. As mentioned above, SLAs routinely define the maximally acceptable jitter and thus there is a need to monitor flows and flow statistics. In one embodiment, the network monitoring and analytics system enables tracing of a message's transit through a point or set of points within a network to a high degree of confidence.

Metadata Correlation

Figure 6:
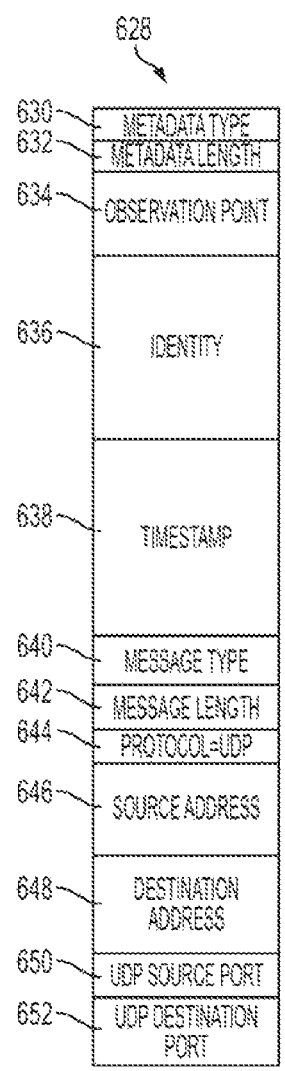
FIG. 6 illustrates one embodiment of derived metadata for an IPv4 packet.

As described above, in various embodiments, the hash value identifies a message to a high degree of certainty. The hash value, or identity, further enables the identification of a message even if the message has passed through one or more network devices that change some portion of the message and/or transport the message in a number of ways, such as, for example, via frames, packets, and/or datagrams with a potential for fragmentation. The identity of the message is used in combination with other information derived from the message, the message metadata, the location of the observation point and the time of the observation for analysis of the network. The combination of information comprises metadata derived from the message. An example of metadata for an IPv4 packet comprising a message is illustrated in FIG. 6. The exact number of fields, their size and position within the metadata are implementation dependent and may depend on, for example, the protocol, frame, cell, message length, network, and/or other factors.

FIG. 6 illustrates one embodiment of message metadata 628 collected for an IPv4 packet at a first observation point. The message metadata 628 comprises metadata type 630 and metadata length 632 identifiers. The message metadata 628 further comprises observation point dependent metadata, such as, for example, an observation point field 634 and a timestamp 638. The message metadata 628 further comprises message specific metadata, such as, for example, a message identity 636 generated by the sparse hash function or a plurality of sparse hash functions, a message type 640, a message length 642, a message protocol 644, a source address 646, a destination address 648, a source port 650, and a destination port 652.

Figure 7:
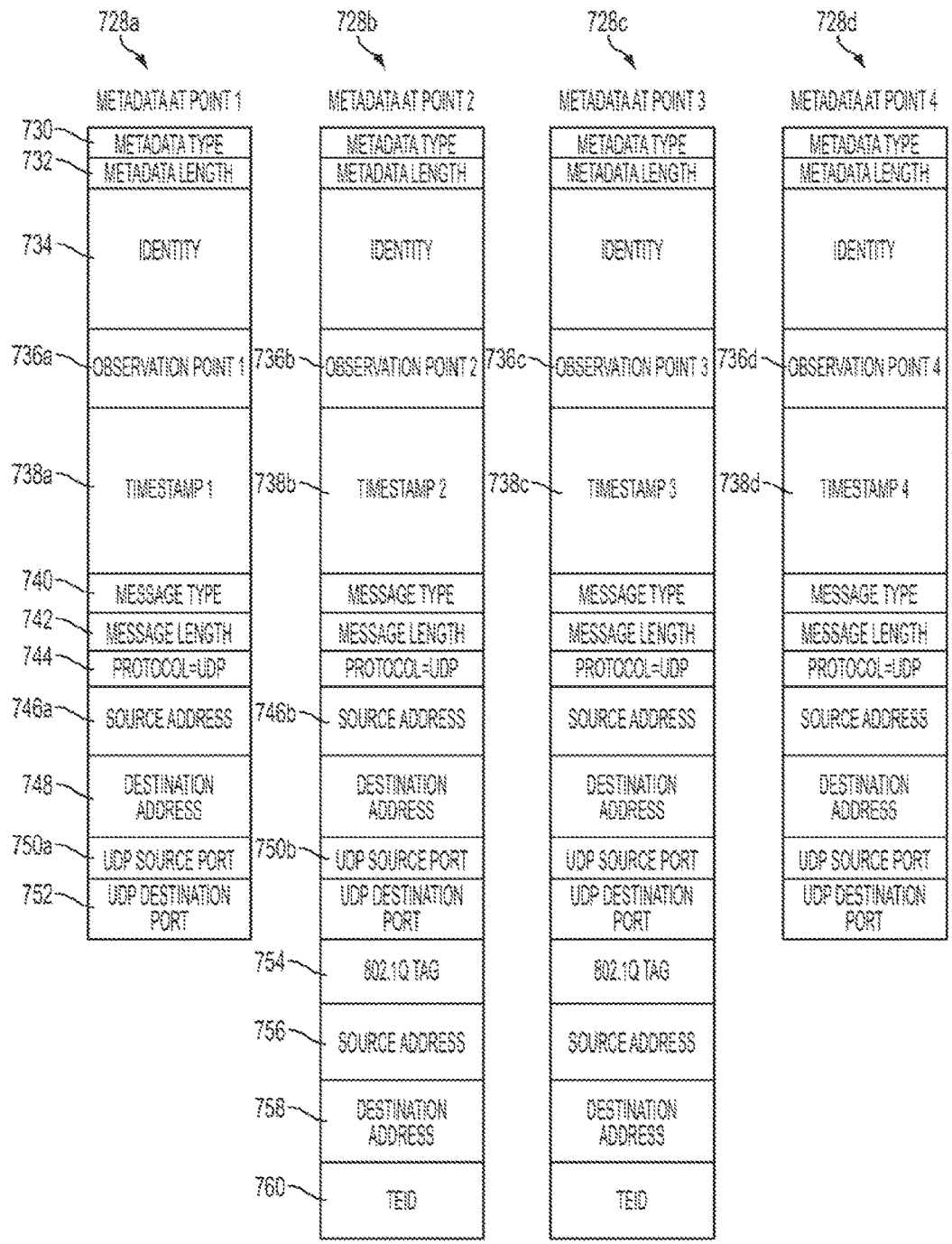
FIG. 7 illustrates one embodiment of metadata collected at various observation points within a network.

In one embodiment, the metadata created at each observation point in the message's trajectory is similar. Different observation points may generate more or less fields in the metadata. For example, as illustrated in FIG. 7, the metadata fields for a plurality of observation points 728a-728d may vary. For example, in the illustrated embodiment, each of the observations points 728a-728d collect metadata, such as, for example, observation point identifiers 736a-736d, a timestamp field 738a-738d, message type 740, and/or additional metadata. A second observation point 702b and a third observation point 702c, corresponding to the entry and exit of the GTP tunnel, comprise additional fields, including the 802.1Q VLAN tag 754, the IPV4 Source 756 and Destination Addresses 758 of the tunnel, and the GTP Tunnel Endpoint Identifier (TEID) 760. In some embodiments, metadata from two or more observation points 728a-728d is associated, or correlated, by matching the identities of the message at each observation point 728a-728d. Although the hash-generated identities 734 are highly probable to be unique to a given message for a given total number of messages, it is still possible that identities may be the same for different messages. In some embodiments, the metadata fields are used to disambiguate different messages with matching hash generated identities. In various embodiments, the generated metadata is provided to a network analytics system and used for analysis of the network.

Disambiguation of Hash Collisions

As discussed above, collisions may occur over a large message set. The network monitoring and analytics systems and methods are configured to disambiguate collisions. In various embodiments, the network monitoring and analytics system disambiguates messages through secondary, tertiary, or additional hashes (such as, for example, different hashes of the same and/or different subsets of the invariant fields), the length of the message, any or all subset fields of the original and/or transformed fields of the message, the location of the observation points, the topology of the observation points and/or the time(s) of the observation.

In some embodiments, message type fields source and/or destination ports, and/or length of the message are used for disambiguating the messages with matching hash identities 734. For instance, two messages with the same hash identity but different message lengths are different messages, regardless of the matching hash identity. Other fields of the packet such as IPv4 source, observation point, location, topology and observation time(s), may be used to disambiguate one or more messages.

Figure 8:
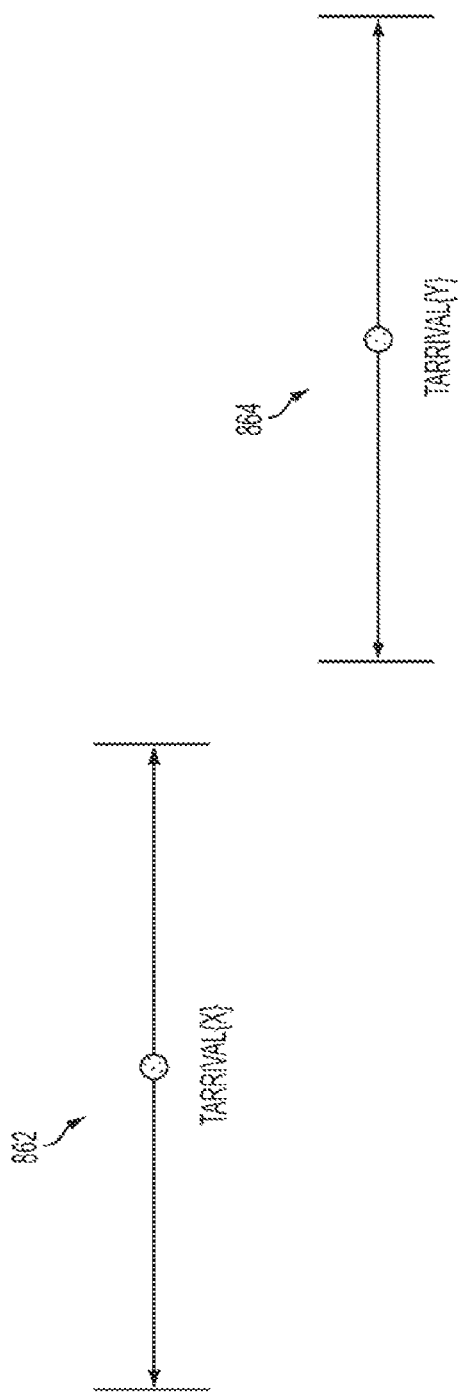
FIG. 8 illustrates one embodiment of discrete time periods used for disambiguation of hash function values.

FIG. 8 illustrates one embodiment of disambiguation of two messages by time. All other fields of the packet being the same, messages can be disambiguated by excluding messages that fall outside of an "existence" window 862, 864. The existence window 862, 864 is relative to the time of one message at a particular observation point, versus another message at the same observation point.

For example, in the illustrated embodiment, Message X arrives at time Tarrival(X) 866. Tarrival(X) 866 is within a first time range 862. Message X's hash value, for the purposes of trajectory monitoring, only extends to include the earliest possible originating time of the packet to the latest possible time of egress to the network, as shown by the first time range 862. A second message, Message Y, arrives at time Tarrival(Y) 868. Message Y comprises the same hash value as Message X. Message X and Message Y may be disambiguated, as Tarrival(Y) 868 falls outside of the possible existence times for Message X, the first time range 862, and within a possible existence time for Message Y, the second time range 864.

In some embodiments, messages comprising matching hash values are disambiguated by location and/or trajectory. A path of a packet comprising a first message is constrained to a first subset of observation points and a path of a packet comprising a second message is constrained to a second subset of observation points. The first and second subsets of observation points are partially and/or wholly non-overlapping. Messages are disambiguated by observation point and trajectory, as the first packet and the second packet comprise different, unique paths and/or trajectories through the network.

Incremental Aggregation of Metadata.

Figure 9:
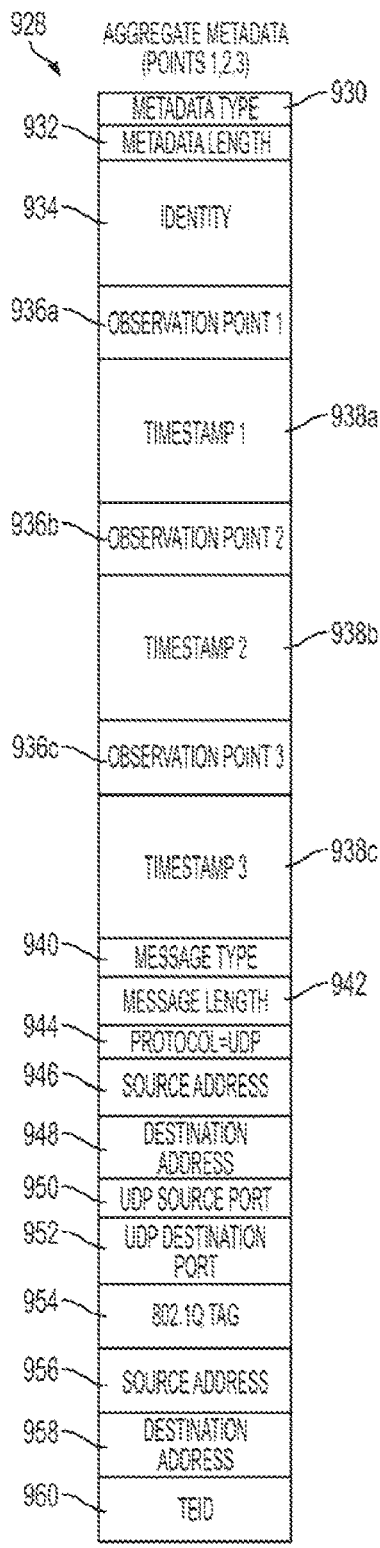
FIG. 9 illustrates one embodiment of incremental aggregation of metadata.

FIG. 9 illustrates one embodiment of incremental aggregation of metadata. Incremental aggregation of metadata can be performed as desired at any point in the network. The metadata at each observation point within the network is retained for a period of time that allows metadata from other observation points to traverse to an aggregation point. Incremental aggregation increases the efficiency of the network as the bandwidth for aggregated metadata is less than multiple separate metadata transmissions. The aggregated metadata comprises multiple observation point and timestamps, along with the various fields aggregated without duplication. The aggregation point generates an aggregated metadata set 928. The aggregated metadata set 928 comprises invariant metadata, such as, for example, a metadata type 930, a metadata length 932, a message identity 934, a message type 940, a message length 942, a protocol 944, and/or a destination port 952. The aggregated metadata set 928 further comprises observation point dependent metadata, such as, for example, observation point identifiers 936*a*-936*c*, timestamps 938*a*-938*c*, and/or metadata generated by the observation point, such as, for example, an 802.1Q tag 954, a source address 956, a destination address 958, and/or a TEID tag 960.

Explorative Visualization of Complex Networks in Constrained Space

In some embodiments, the statistics generated by the network monitoring and analytics system are presented to a user as a visual output. The visual output provides monitoring of up to every message at every node across a distributed network, such as, for example, a nationwide distributed network and/or monitoring of up to every message communication process in, among, and between virtual and/or physical servers, switches, and routers in, among, and between datacenters. At any given time, in a large-scale, distributed and complex network, there can be tens or hundreds of millions of network packets transiting between an originating source and a final destination, passing through multiple network routers and switches in between. Network packets, or messages, can be grouped together into "flows" based on common characteristics including, but not limited to, source IP address, destination IP address, source port number, destination port number, and protocol type.

To quickly identify problems and determine when and where the problems occurred, network operators must have the ability to visualize, in real-time, the state of the network, including, but not limited to, the throughput, loss, jitter, latency, errors, retransmits, and fragmentations of the network. In addition, it is paramount for network operators to understand and visualize the flows on the network to determine the paths of the packets on the network in order to determine the optimal distribution of packets.

Figure 10:
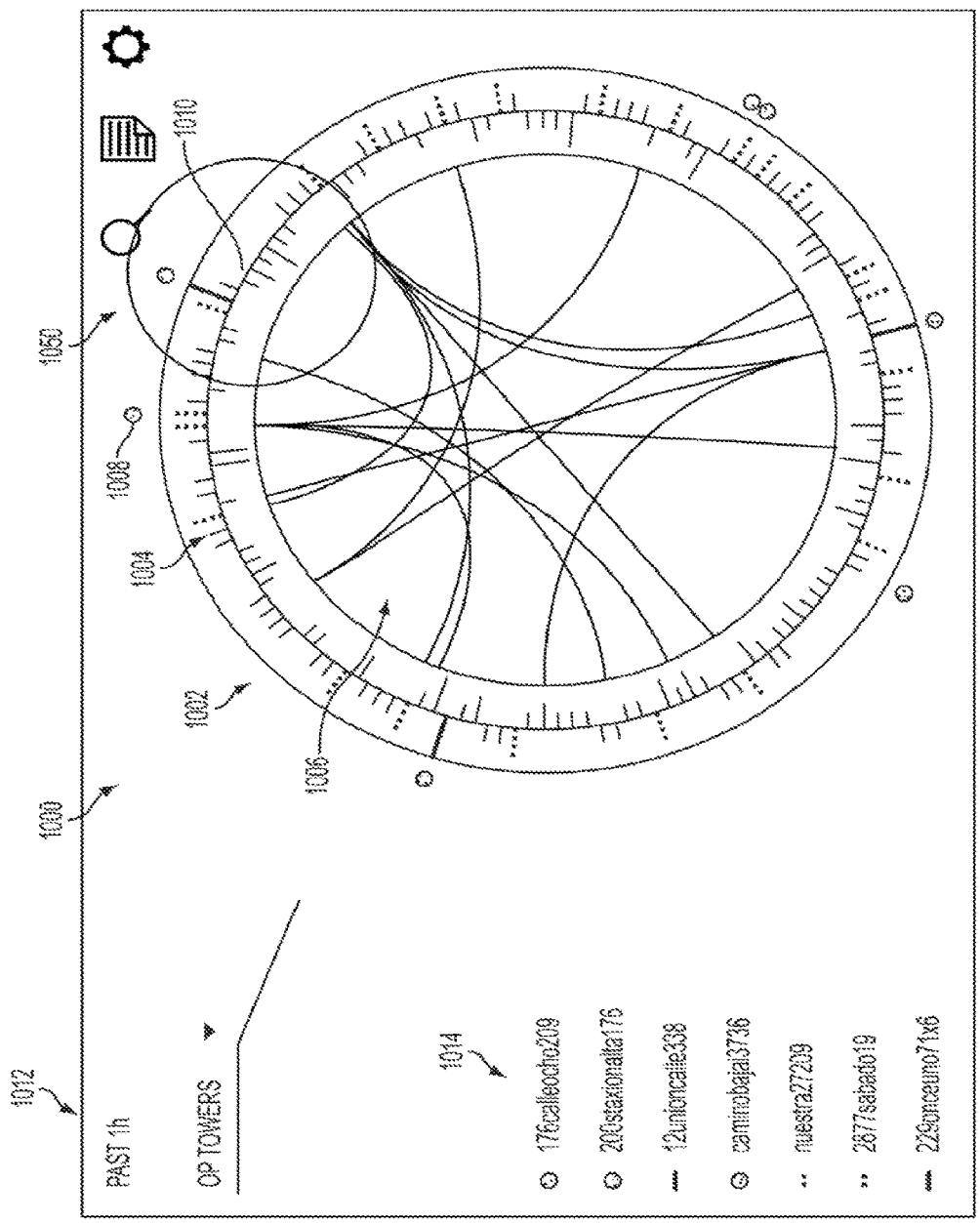
FIG. 10 illustrates one embodiment of a network visualization display.

FIG. 10 illustrates one embodiment of a network visualization display 1000. The network visualization display 1000 provides visualization of network states, flows, and relationships between nodes of the network. The network visualization display 1000 comprises a chord diagram 1002. The chord diagram 1002 is a circular diagram with one or more nodes 1004 on the edge of the circle. One or more chords 1006 represent the relationships, or flows, between the one or more nodes 1004. The chord diagram 1002 is configured to provide visualization of a network in real-time and "at-a-glance" to a network operator.

The chord diagram 1002 illustrates the relationship between the nodes 1004. The nodes 1004 represent, for example, network elements, virtual network elements, and/or networks of networks. The chord diagram 1002 further illustrates the relationship between networks of interdependent networks, traffic flow and directions of flows between nodes 1004, and/or traffic flows and directions of flows between interdependent networks. In some embodiments, the chord diagram 1002 illustrates various network metrics, such as, for example, throughput, latency, jitter, loss, retransmission rate, error, and/or other network analytics measured by the network monitoring and analytics systems and methods. The chord diagram 1002 identifies the comparative utilization of network elements, whether those elements are close to capacity, and the comparative amount of traffic flow between nodes. Errors, or problems, with the network and/or the relationship between errors, are identified in the chord diagram 1002. In some embodiments, historical error rates and problems are identified on the chord diagram 1002. In various embodiments, the network operations visualized by the chord diagram 1002 are modifiable by, for example, dynamically changing the view by updating network parameters, such as, for example, time duration, sort order, selection of network elements, threshold of metrics, and/or geographical areas.

In various embodiments, the nodes 1004 in the chord diagram 1002 represent physical and/or virtual network elements, such as, for example, routers, switches, firewalls, intrusion detection/prevention devices, network monitoring/metering devices, multiple network elements, and/or networks of networks. The network visualization display 1000 enables encoding of a large volume of information for each of the nodes 1004, such as, for example, throughput, utilization ratio, thresholds, mean and/or average utilization. Throughput comprises the volume of data flowing through a node 1004 and is measured, for example, in megabits per second (Mbps). Utilization ratio comprises the current traffic load at a node 1004 and/or over the network compared to the maximum traffic load that the individual node 1004 and/or overall network can handle and is presented, for example, as a percentage of maximum traffic load. Thresholds comprise user-defined thresholds of utilization and/or throughput. In some embodiments, visual indicators are provided indicating whether the utilization and/or throughput has met the user-defined threshold values. The mean/average utilization comprises the average traffic flow the node 1004 and/or network.

Figure 11:
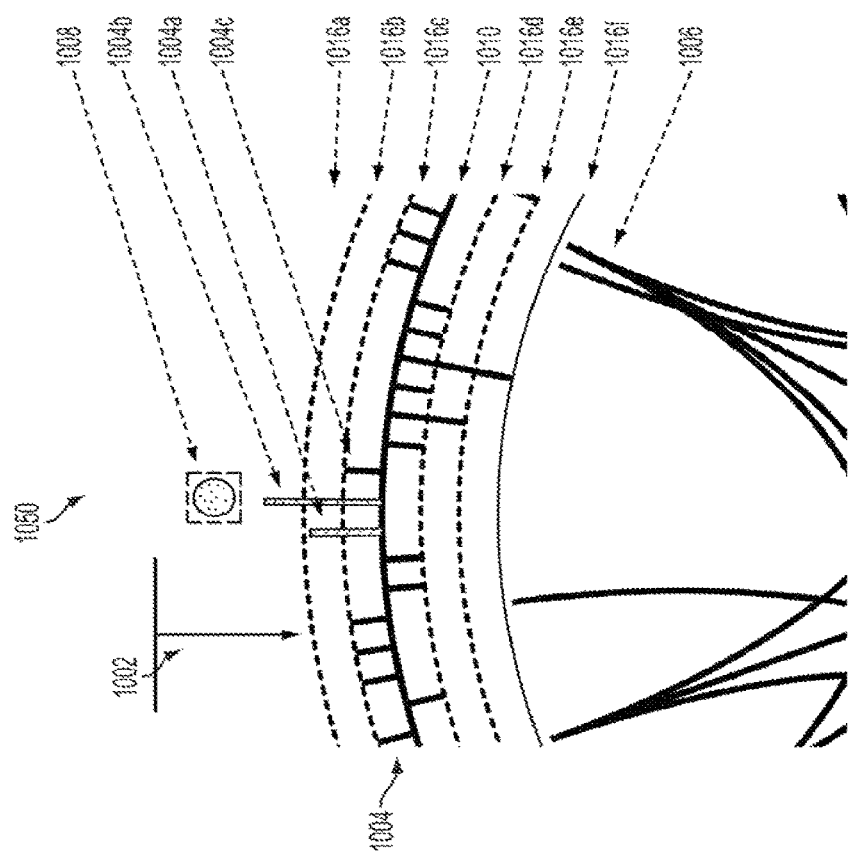
FIG. 11 illustrates a section of the network visualization display of FIG. 10.

FIG. 11 illustrates a section 1050 of the chord diagram 1002. The chord diagram 1002 comprises a plurality of nodes 1004. Visual elements may be presented to the user to identify network problems. Network errors and/or issues may by transient. A problem in the network may be masked by a change in traffic flow and may not be apparent during a fixed time within the network. Transient problems may indicate larger issues within the network. The network visualization display 1000 provides a real-time visual indication of the network to identify transient network issues and address larger issues within the network.

In some embodiments, the network visualization display 1000 utilizes visual indicators, such as, for example, colored elements, to identify issues within the network. In the illustrated embodiment, the plurality of nodes 1004 are presented as color bands. The color of the band indicates the status of the node 1004. For example, in the illustrated embodiment, a first node 1004*a* is illustrated as an orange band, a second node 1004*b* is illustrated as a red band, and a third node 1004*c* is illustrated as a grey node. The orange color of the first node 1004*a* indicates that a non-urgent issue exists at the first node 1004*a*. For example, the first node 1004*a* may be experiencing above average traffic or a slight degradation of performance. The red color of the second node 1004*b* indicates an urgent issue exists at the second node 1004*b*. For example, the second node 1004*b* may have gone down, may not be sending traffic, and/or may be heavily over-utilized and is dropping packets. The grey color of the third node 1004*c* may indicate that the third node 1004*c* is operating within normal operating parameters and that no issues currently exist at the third node 1004*c*.

In some embodiments, a visual indicator is provided to draw attention to one or more nodes 1004*b* experiencing urgent issues requiring immediate attention. For example, in the illustrated embodiment, a dot 1008 is provided as a visual indicator of a node that currently has and/or has previously had problems during a selected time period. The dot 1008 enables network operators to identify nodes 1004*b* that have historically and/or are currently experiencing issues. A large number of dots 1008, or other visual indicators, indicate larger network problems. The dot 1008 comprises a color scheme similar to the node color bands discussed above, and identifies urgent and non-urgent issues based on the color of the dot.

In the illustrated embodiment, the center ring 1010 represents the average traffic utilization for each of the nodes 1004 during the selected time period. In some embodiments, the average traffic utilization is calculated over the entire life of the node 1004, for a predetermined time period, and/or for a user defined time period. The actual value represented by the center ring 1010 may vary from node to node but will always represent the average utilization for the selected time period of each of the nodes 1004.

In some embodiments, the length of the band representing each of the nodes 1004 is determined by the standard deviation of the node 1004 from the average utilization of the node 1004. A longer node 1004 in the positive direction away from the center ring 1008 indicates an above average traffic utilization. A longer node 1004 in a negative direction from the center ring 1008 indicates below-average traffic utilization for the node 1004. Conversely, the shorter the node 1004 in either direction, the lower the standard deviation of the traffic flow of the node 1004 from the average traffic utilization. In some embodiments, three possible sizes are defined for each node: long, medium, and short. A long size is +/−2.5 standard deviations from the average, and represents about 1% of the nodes 1004 in the illustrated embodiment. The medium size is +/−1.96 standard deviations from the average, and in represents about 5% of the 1004 nodes in the illustrated embodiment. The short size is +/−1 standard deviation from the average, and represents about 31.7% of the nodes 1004 in the illustrated embodiment. Although specific values have been given for long, medium, and short nodes, those skilled in the art will recognize that these values are given by way of example only, and are not intended to be limited. Any value of standard deviation may be set for each of the long, medium, or short value thresholds.

By visualizing the size of the nodes 1004 using standard deviation, a network operator can quickly, and at-a-glance, determine which of the network nodes 1004 are reaching critical issues, such as, for example, nodes that are +2.5 standard deviations from average. Network operators can also leverage the visualization to identify network elements that have very low utilization, such as, for example, nodes that are −2.5 standard deviations from average. The network operator and/or an automated system can rebalance the network traffic to take advantage of under utilized equipment instead of purchasing additional network equipment.

In some embodiments, the direction of growth of each node 1004 away from the center ring 1008 indicates over and/or under utilization of the node 1004 compared to the average utilization of the node 1004. An outward growth of a node 1004 from the center ring 1008 indicates over utilization. An inward growth of a node 1004 from the center ring 1008 indicates under utilization. The combination of length and direction of the node provides network operators a clear visualization of the current utilization of network equipment. For example, in the illustrated embodiment, a second node 1004*b* extends +2.5 standard deviations from the center ring 1010 indicating a critical level of above average traffic flow.

In some embodiments, the color of each node 1004 indicates the status of the node 1004. For example, in the illustrated embodiment, three colors, grey, orange, and red, indicate the status of various nodes. A grey node indicates a node 1004 within a normal deviation from the average utilization of the node. An orange node indicates a non-urgent issue with a node 1004*a*. A red node indicates an urgent issue with a node 1004*b*. For example, a red node may indicate that a network element has gone offline and/or has not been sending traffic or may indicate that the network element is heavily over-utilized and is dropping packets. The network visualization display 1000 enables full precision visualization of a network within a constrained space and provides full interactivity for network operators to enable operators to understand and/or explore the network.

In some embodiments, the network visualization display 1000 illustrates a global network comprising a plurality of interdependent local networks. Each node 1004 of the network visualization display 1000 may represent one or more local networks. The chords 1006 represent the relationships and flows between the interdependent local networks. In some embodiments, the network visualization display 1000 comprises one or more layers, allowing a network operator to drilldown into a specific node and retrieve a chord diagram 1002 representative of the local network represented by the node 1004 in the overall network visualization display 1000. Based on the design of the network, additional layers may be present at each of the network layers. For example, in one embodiment, a distributed global network comprises three network levels, a global level, a country level, and a regional level. The global level comprises a chord network comprising nodes representing networks within one or more countries, such as, for example, Great Britain, the United States, Spain, Germany, and/or additional countries. A network operator may drilldown into each of the nodes of the global network chord network to view a second network level chord diagram representative of a nationwide network within the selected country. For example, a network operator may drilldown into the node representative of the United States and receive a chord diagram representative of the connections between networks within major cities of the United States, such as, for example, New York, Los Angeles, San Francisco, Chicago, and/or other cities. The network operator may further drilldown into each of the city nodes of the nationwide chord diagram to view a chord diagram representative of a local network within each of the specific cities. For example, a network operator may select the New York node to receive a chord diagram representative of the local mobile network within New York City.

In some embodiments, the network visualization display 1000 provides visualization of network equipment utilization. A visual indicator 1008 may identify over-utilization and under-utilization of network equipment. Over-utilization of network equipment may indicate bottlenecks and may require the acquisition of additional network equipment to handle the network load. Under, or low, utilization may indicate over-provisioned or over-equipped networks. Over-provisioned networks may prevent a company or organization from recouping investment as quickly as predicted. The ability to visualize the utilization of a network provides mission-critical information to network operators.

Figure 12:
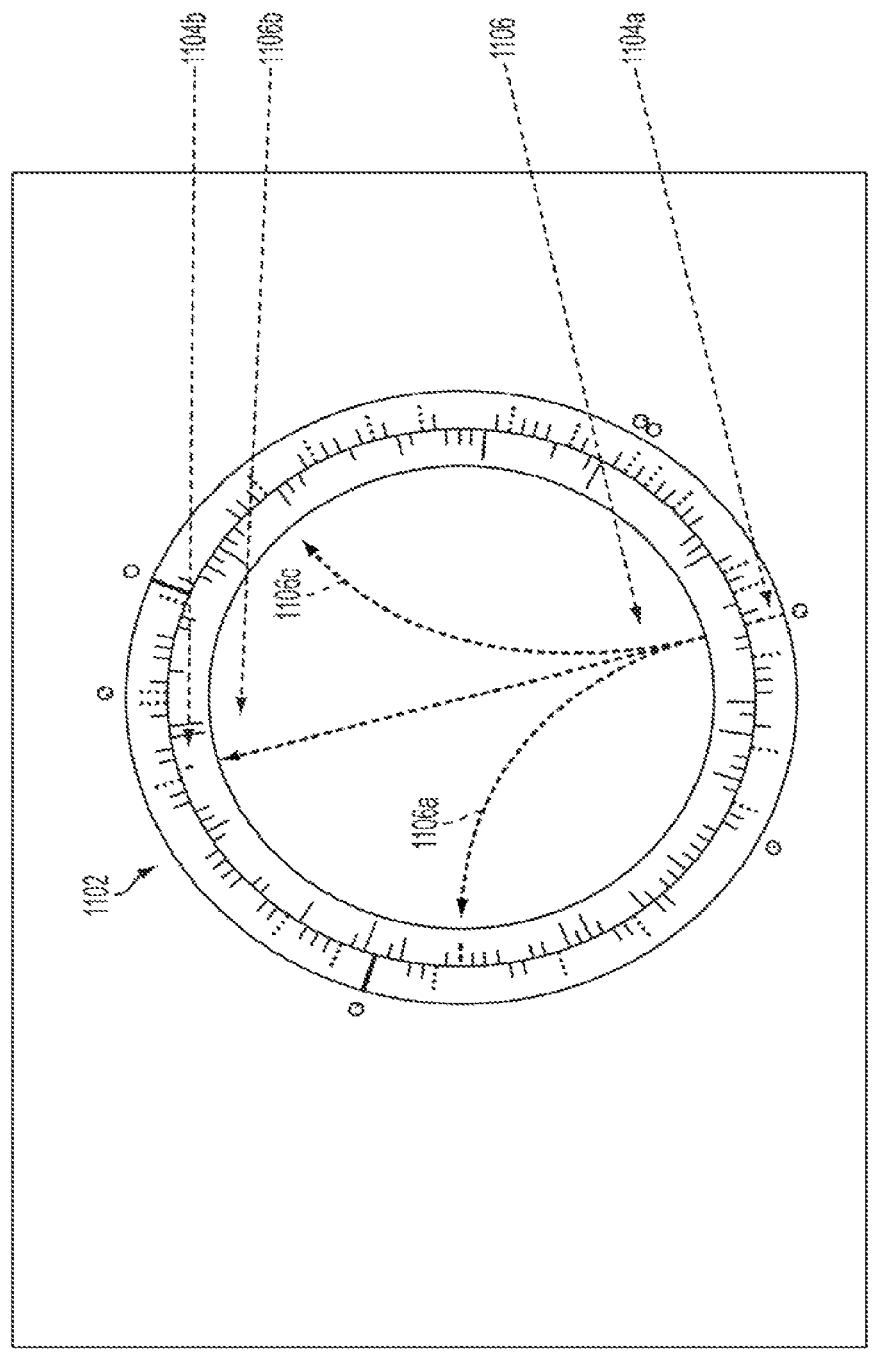
FIG. 12 illustrates one embodiment of a chord diagram comprising a plurality of chords.

FIG. 12 illustrates one embodiment of a chord diagram 1102 comprising a plurality of chords 1106a-1106c. The plurality of chords 1106a-1106c represents the relationships amongst and between the network nodes 1104 and illustrates the quantity of information flowing between the nodes 1104. The plurality of chords 1106a-1106c provide network operators the ability to explore the network and network flow to visualize, in real-time, existing, prior, or developing network problems. The chords 1106a-1106c comprise various features to provide information to network operators, such as, for example, direction, origin, color, width, and path. The direction of the traffic flow represented by a chord 1106a-1106c is indicated by an arrow 1110 at the end of the path, which identifies the destination node 1104b of the traffic flow. The originating node 1104a is the node that does not have an arrow indicator.

Traffic flow of a single node 1104a represents traffic originating at and/or terminating at the selected node 1104a. In some embodiments, one or more chords 1106a-1106c illustrate the traffic originating from a selected node 1104a. The traffic originating at a selected node 1104a is illustrated as one or more chords 1106a-1106c radiating, or fanning-out, from the selected node 1104a. The arrows 1110a-1110c indicate the destination node for each chord 1106a-1106c. In some embodiments, one or more chords illustrate the flow of traffic destined for a selected node 1104b. The source of the traffic will come from one or more other nodes 1104a and will indicate the flow of traffic into the selected node 1104b.

In some embodiments, the color of the chords 1106a-1106c indicates potential problems with traffic flow between one or more nodes 1104a-1104d. The colors of a chord 1106a-1106c indicate, for example, excessive loss of packets, large jitter, large latency, excessive retransmissions, and/or additional network flow issues. In some embodiments, the width of the chord 1106a-1106c indicates one or more selected parameters, such as, for example, the volume of traffic between a first node 1104a and a second node 1104b, the amount of latency, jitter, loss, errors, and/or retransmissions between a first node 1104a and a second node 1104b, and/or other selected parameters.

The path of traffic flow from a first node to a second node need not comprise a direct path. For example, in one embodiment, a path from a first node to a second node may pass through a third node and a fourth node. For example, a packet originating at a first node is transmitted from the first node to a third node. The third node retransmits the packet to a fourth node. The fourth node retransmits the packet to the second node. The path of traffic from a first node to a second node may be represented as a series of chords comprising directional arrows to indicate the flow of traffic from each of the source nodes, destination node, and any intermediate nodes.

The network visualization display 1000 enables a network operator to interact with different components on the network and/or explore different parts, or branches, of the network. In some embodiments the network visualization display 1000 allows a user to interact with a node, such as, for example, by hovering a mouse cursor over the node. Interacting with a node 1004 modifies the network visualization display 1000. For example, interacting with a node 1004 may limit the chords 1006 displayed on a chord diagram 1002 to only that traffic flowing to and/or from the selected node 1004. Interacting with a node 1004 may display metrics for the selected node, such as, for example, upstream/downstream traffic throughput, latency, jitter, loss, errors, and/or retransmissions. One or more network nodes 1004 may be selected by, for example, filtering using name, geographic location, utilization, throughput, and/or other parameters.

In some embodiments, the network visualization display 1000 is configured to change the display in response to user interactions. For example, if a user interacts with an un-highlighted node, the selected node is highlighted as well as any nodes that connect directly to the selected node. The path between the selected node and any connected nodes is displayed as a chord. Interacting with a selected node toggles the direction of traffic flow to and from the node. Selecting a chord highlights the selected chord, the originating node, and the destination node for the chord. If a user defines a subset of nodes, the subset of nodes, as well as any nodes connecting directly to at least one of the subset of nodes, are selected.

Figure 13:
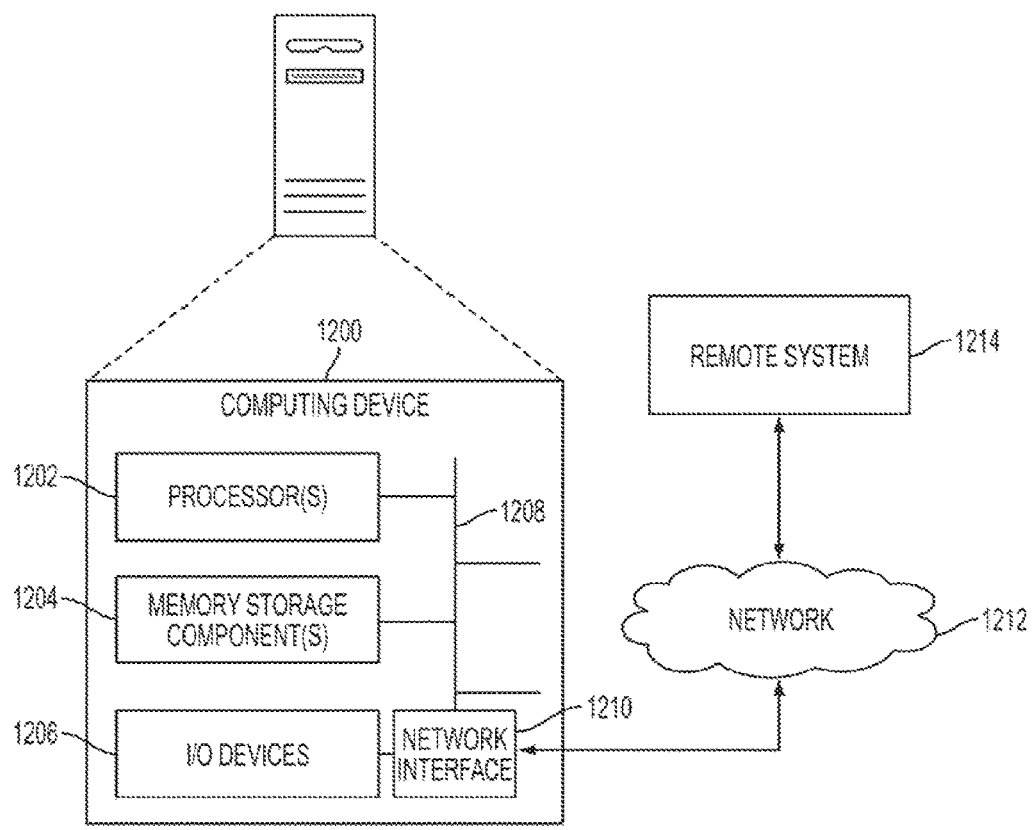
FIG. 13 illustrates one embodiment of a computing device which can be used in one embodiment of the systems and methods for network monitoring and analytics

FIG. 13 illustrates one embodiment of a computing device 1100 which can be used in one embodiment of the systems and methods for network monitoring and analytics. For the sake of clarity, the computing device 1100 is shown and described here in the context of a single computing device. It is to be appreciated and understood, however, that any number of suitably configured computing devices can be used to implement any of the described embodiments. For example, in at least some implementation, multiple communicatively linked computing devices are used. One or more of these devices can be communicatively linked in any suitable way such as via one or more networks (LANs), one or more wide area networks (WANs) or any combination thereof.

In this example, the computing device 1100 comprises one or more processor circuits or processing units 1102, on or more memory circuits and/or storage circuit component(s) 1104 and one or more input/output (I/O) circuit devices 1106. Additionally, the computing device 1100 comprises a bus 1108 that allows the various circuit components and devices to communicate with one another. The bus 1108 represents one or more of any of several types of bus structures, including a memory bus or local bus using any of a variety of bus architectures. The bus 1108 may comprise wired and/or wireless buses.

The processing unit 1102 may be responsible for executing various software programs such as system programs, applications programs, and/or module to provide computing and processing operations for the computing device 1100. The processing unit 1102 may be responsible for performing various voice and data communications operations for the computing device 1100 such as transmitting and receiving voice and data information over one or more wired or wireless communication channels. Although the processing unit 1102 of the computing device 1100 includes single processor architecture as shown, it may be appreciated that the computing device 1100 may use any suitable processor architecture and/or any suitable number of processors in accordance with the described embodiments. In one embodiment, the processing unit 1100 may be implemented using a single integrated processor.

The processing unit 1102 may be implemented as a host central processing unit (CPU) using any suitable processor circuit or logic device (circuit), such as a as a general purpose processor. The processing unit 1102 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 1102 may be coupled to the memory and/or storage component(s) 1104 through the bus 1108. The memory bus 1108 may comprise any suitable interface and/or bus architecture for allowing the processing unit 1102 to access the memory and/or storage component(s) 1104. Although the memory and/or storage component(s) 1104 may be shown as being separate from the processing unit 1102 for purposes of illustration, it is worthy to note that in various embodiments some portion or the entire memory and/or storage component(s) 1104 may be included on the same integrated circuit as the processing unit 1102. Alternatively, some portion or the entire memory and/or storage component(s) 1104 may be disposed on an integrated circuit or other medium (e.g., hard disk drive) external to the integrated circuit of the processing unit 1102. In various embodiments, the computing device 1100 may comprise an expansion slot to support a multimedia and/or memory card, for example.

The memory and/or storage component(s) 1104 represent one or more computer-readable media. The memory and/or storage component(s) 1104 may be implemented using any computer-readable media capable of storing data such as volatile or non-volatile memory, removable or non-removable memory, erasable or non-erasable memory, writeable or re-writeable memory, and so forth. The memory and/or storage component(s) 1104 may comprise volatile media (e.g., random access memory (RAM)) and/or nonvolatile media (e.g., read only memory (ROM), Flash memory, optical disks, magnetic disks and the like). The memory and/or storage component(s) 1104 may comprise fixed media (e.g., RAM, ROM, a fixed hard drive, etc.) as well as removable media (e.g., a Flash memory drive, a removable hard drive, an optical disk, etc.). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 1106 allow a user to enter commands and information to the computing device 1100, and also allow information to be presented to the user and/or other components or devices. Examples of input devices include a keyboard, a cursor control device (e.g., a mouse), a microphone, a scanner and the like. Examples of output devices include a display device (e.g., a monitor or projector, speakers, a printer, a network card, etc.). The computing device 1100 may comprise an alphanumeric keypad coupled to the processing unit 1102. The keypad may comprise, for example, a QWERTY key layout and an integrated number dial pad. The computing device 1100 may comprise a display coupled to the processing unit 1102. The display may comprise any suitable visual interface for displaying content to a user of the computing device 1100. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 1102 may be arranged to provide processing or computing resources to the computing device 1100. For example, the processing unit 1102 may be responsible for executing various software programs including system programs such as operating system (OS) and application programs. System programs generally may assist in the running of the computing device 1100 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, Android OS, Apple OS or other suitable OS in accordance with the described embodiments. The computing device 1100 may comprise other system programs such as device drivers, programming tools, utility programs, software libraries, application programming interfaces (APIs), and so forth.

The computer 1100 also includes a network interface 1110 coupled to the bus 1108. The network interface 1110 provides a two-way data communication coupling to a local network 1112. For example, the network interface 1110 may be a digital subscriber line (DSL) modem, satellite dish, an integrated services digital network (ISDN) card or other data communication connection to a corresponding type of telephone line. As another example, the communication interface 1110 may be a local area network (LAN) card effecting a data communication connection to a compatible LAN. Wireless communication means such as internal or external wireless modems may also be implemented.

In any such implementation, the network interface 1110 sends and receives electrical, electromagnetic or optical signals that carry digital data streams representing various types of information, such as the selection of goods to be purchased, the information for payment of the purchase, or the address for delivery of the goods. The network interface 1110 typically provides data communication through one or more networks to other data devices. For example, the network interface 1110 may effect a connection through the local network to an Internet Host Provider (ISP) or to data equipment operated by an ISP. The ISP in turn provides data communication services through the internet (or other packet-based wide area network). The local network and the Internet both use electrical, electromagnetic or optical signals that carry digital data streams. The signals through the various networks and the signals on the network interface 1110, which carry the digital data to and from the computer system 110, are exemplary forms of carrier waves transporting the information.

The computer 1100 can send messages and receive data, including program code, through the network(s) and the network interface 1110. In the Internet example, a server might transmit a requested code for an application program through the internet, the ISP, the local network (the network 1112) and the network interface 1110. In accordance with the invention, one such downloaded application provides for the identification and analysis of a prospect pool and analysis of marketing metrics. The received code may be executed by processor 1104 as it is received, and/or stored in storage device 1110, or other non-volatile storage for later execution. In this manner, computer 1100 may obtain application code in the form of a carrier wave.

Various embodiments may be described herein in the general context of computer executable instructions, such as software, program modules, and/or engines being executed by a computer. Generally, software, program modules, and/or engines include any software element arranged to perform particular operations or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, program modules, and/or engines may be located in both local and remote computer storage media including memory storage devices.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

While various details have been set forth in the foregoing description, it will be appreciated that the various embodiments of the apparatus, system, and method for anonymous sharing and public vetting of content may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Some or all of the embodiments described herein may generally comprise technologies which can be implemented, individually, and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various aspects of the subject matter described herein are set out in the following numbered clauses:

1. A computer-implemented method, comprising: calculating, by a processor, a sparse hash value for a first message at a plurality of observation points on a network using a first sparse hash function; associating, by the processor, metadata with the sparse hash value of the first message; tracking, by the processor, the transit of the first message over the network; and generating, by the processor, one or more network analytics for the first message over the network, wherein the one or more network analytics are generated from the associated metadata.

2. The computer-implemented method of clause 1, comprising calculating, by the processor, the sparse hash value of the first message for one or more invariant fields of the first message.

3. The computer-implemented method of clause 2, comprising treating, by the processor, one or more variant fields as a constant value during calculation of the sparse hash value.

4. The computer-implemented method of clause 2, comprising: calculating, by the processor, a sparse hash value for each of a plurality of messages at the plurality of observation points on the network using the first sparse hash function; associating, by the processor, metadata with the has value calculated for each of the plurality of messages; tracking, by the processor, the transit of the plurality of messages over the network; and generating, by the processor, the one or more network analytics for the plurality of messages over the network.

6. The computer-implemented method of clause 4, wherein the first sparse hash function generates sparse hash values that are highly probable to be unique for the first plurality of messages.

7. The computer-implemented method of clause 4, comprising: calculating, by the processor, a sparse hash value for a second plurality of messages at the plurality of observation points on the network using a second sparse hash function, wherein the first sparse hash function and the second sparse hash function are different.

8. The computer-implemented method of clause 1, wherein the one or more network analytics comprises at least one of throughput, loss, jitter, latency, errors, retransmits, and fragmentation of packets.

9. An apparatus comprising: a processor; and a non-transitory computer-readable medium coupled to the processor, the non-transitory computer-readable medium configured to store computer program instructions that when executed by the processor are operable to cause the processor to: calculate a sparse hash value for a first message at a plurality of observation points on a network using a first sparse hash function; associate metadata with the sparse hash value calculated for the first message; track, the transit of the first message over the network; and generate one or more network analytics for the first message over the network.

10. The apparatus of clause 9, wherein the processor is further configured to calculate the sparse hash value of the first message using one or more invariant fields of the first message.

11. The apparatus of clause 10, wherein the processor is further configured to treat one or more variant fields of the first message as a constant value during calculation of the sparse hash value.

12. The apparatus of clause 10, wherein the processor is further configured to: calculate a sparse hash value for each of a plurality of messages at the plurality of observation points on the network using the first sparse hash function; associate metadata with the sparse hash value calculated for each of the plurality of messages; track the transit of the plurality of messages over the network; and generate the one or more network analytics for the plurality of messages over the network.

13. The apparatus of clause 12, wherein the first sparse hash function generates sparse hash values that are highly probable to be unique for the first plurality of messages.

14. The apparatus of clause 12, wherein the processor is further configured to calculate a sparse hash value for a second plurality of messages at the plurality of observation points on the network using a second sparse hash function, wherein the first sparse hash function and the second sparse hash function are different.

15. The apparatus of clause 9, wherein the one or more network analytics comprises at least one of throughput, loss, jitter, latency, errors, retransmits, and fragmentation of packets.

16. A computer-implemented method comprising: receiving, by a processor, a plurality of metadata packets corresponding to a plurality of messages, wherein each of the metadata packets comprises a sparse hash value; identifying, by the processor, a plurality of matching sparse hash values, wherein the plurality of matching sparse hash values correspond to at least a first message and a second message; disambiguating, by the processor, the first message and the second message, wherein the first message and the second message are disambiguated using the metadata associated with the plurality of sparse hash values.

17. The computer-implemented method of clause 16, comprising: determining, by the processor, a first existence window for the first message; comparing, by the processor, a time of arrival of each of the plurality of metadata packets to the first existence window; and identifying, by the processor, a subset of the plurality of metadata packets corresponding to the first message by identifying one or more metadata packets comprising matching sparse hash values and a time of arrival within the first existence window for the first message.

18. The computer-implemented method of clause 16, comprising: determining, by the processor, a first trajectory for the first message; comparing, by the processor, a location field for each of the plurality of metadata packets to the first trajectory for the first message; and identifying, by the processor, a subset of the plurality of metadata packets corresponding to the first message by identifying one or more metadata packets comprising matching sparse hash values and the location field corresponding to the first trajectory.

19. The computer-implemented method of clause 16, comprising: comparing, by the processor, each of the plurality of metadata packets; identifying, by the processor, the first message by identifying a first subset of the plurality of metadata packets comprising matching sparse hash values and at least one invariant field of the associated message, wherein the invariant field is used in the calculation of the sparse hash value; and identifying, by the processor, the second message by identifying a second subset of the plurality of metadata packets comprising matching sparse hash values and at least one invariant field of the associated message, wherein the invariant field is used in the calculation of the sparse hash value.

20. The computer-implemented method of clause 19, wherein the metadata associated with the plurality of matching sparse hash values comprises a length of the message corresponding to the sparse hash value.

21. The computer-implemented method of clause 19, wherein the metadata associated with the plurality of matching sparse hash values comprises a subset of the invariant field.

22. The computer-implemented method of clause 16, wherein each of the plurality of metadata packets comprise comprises aggregated metadata, wherein the aggregated metadata comprises metadata for at least two of the observation points through which the associated message has traveled.

23. An apparatus comprising: a processor; and a non-transitory computer-readable medium coupled to the processor, the non-transitory computer-readable medium configured to store computer program instructions that when executed by the processor are operable to cause the processor to: receive a plurality of metadata packets corresponding to a plurality of messages, wherein each of the metadata packets comprises a sparse hash value; identify a plurality of matching sparse hash values, wherein the plurality of matching sparse hash values correspond to at least a first message and a second message; disambiguate the first message and the second message, wherein the first message and the second message are disambiguated using the metadata associated with the plurality of sparse hash values.

24. The apparatus of clause 23, wherein the processor is further configured to: determine a first existence window for the first message; compare a time of arrival of each of the plurality of metadata packets to the first existence window; and identify a subset of the plurality of metadata packets corresponding to the first message by identifying one or more metadata packets comprising matching sparse hash values and a time of arrival within the first existence window for the first message.

25. The apparatus of clause 23, wherein the processor is further configured to: determine a first trajectory for the first message; compare a location field for each of the plurality of metadata packets to the first trajectory for the first message; and identify a subset of the plurality of metadata packets corresponding to the first message by identifying one or more metadata packets comprising matching sparse hash values and the location field corresponding to the first trajectory.

26. The apparatus of clause 23, wherein the processor is further configured to: compare each of the plurality of metadata packets; identify the first message by identifying a first subset of the plurality of metadata packets comprising matching sparse hash values and at least one invariant field of the associated message, wherein the invariant field is used in the calculation of the sparse hash value; and identify the second message by identifying a second subset of the plurality of metadata packets comprising matching sparse hash values and at least one invariant field of the associated message, wherein the invariant field is used in the calculation of the sparse hash value.

27. The apparatus of clause 26, wherein the metadata associated with the plurality of matching sparse hash values comprises a length of the message corresponding to the sparse hash value.

28. The apparatus of clause 26, wherein the metadata associated with the plurality of matching sparse hash values comprises a subset of the invariant field.

29. The apparatus of clause 26, wherein each of the plurality of metadata packets comprise comprises aggregated metadata, wherein the aggregated metadata comprises metadata for each observation point through which the associated message has traveled.

30. A computer-implemented method, comprising: generating, by a processor, a network visualization display to provide a visual indication of one or more network analytics, wherein the network visualization display comprises: a plurality of nodes; and one or more connections between the plurality of nodes.

31. The computer-implemented method of clause 30, wherein the network visualization display comprises a chord diagram, wherein the plurality of nodes are arranged in a circular configuration, and wherein the one or more connections between the plurality of nodes are displayed as chords.

32. The computer-implemented method of clause 31, comprising: generating, by the processor, a visual representation of each of the plurality of nodes, wherein the visual representation is indicative of a traffic flow of the node.

33. The computer-implemented method of clause 32, wherein the visual representation comprises a distance from a center line, wherein the center line is representative of an average traffic flow of the node, and wherein the distance from the center line is indicative of the traffic flow of the node compared to the average traffic flow of the node.

34. The computer-implemented method of clause 31, wherein each of the plurality of nodes represents a network, and wherein the chord diagram represents a network of networks.

35. The computer-implemented method of clause 31, wherein each of the plurality of nodes represents a network device, and wherein the chord diagram represents a local network.

36. The computer-implemented method of clause 31, comprising generating, by the processor, a visual indicator indicative of a mission-critical problem at a node.

37. The computer-implemented method of clause 31, comprising generating, by the processor, a color for each of the plurality of nodes, wherein the color indicates the status of the node.

38. The computer-implemented method of clause 31, comprising: receiving, by the processor, a selection of a first node; generating, by the processor, a traffic flow of the first node; and generating, by the processor, one or more chords indicative of the traffic flow between the first node and one or more additional nodes.

39. An apparatus comprising: a processor; and a non-transitory computer-readable medium coupled to the processor, the non-transitory computer-readable medium configured to store computer program instructions that when executed by the processor are operable to cause the processor to: generate a network visualization display to provide a visual indication of one or more network analytics, wherein the network visualization display comprises: a plurality of nodes; and one or more connections between the plurality of nodes.

40. The apparatus of clause 39, wherein the network visualization display comprises a chord diagram, wherein the plurality of nodes are arranged in a circular configuration, and wherein the one or more connections between the plurality of nodes are displayed as chords.

41. The apparatus of clause 40, wherein the processor is further configured to generate a visual representation of each of the plurality of nodes, wherein the visual representation is indicative of a traffic flow of the node.

42. The apparatus of clause 41, wherein the visual representation comprises a distance from a center line, wherein the center line is representative of an average traffic flow of the node, and wherein the distance from the center line is indicative of the traffic flow of the node compared to the average traffic flow of the node.

43. The apparatus of clause 40, wherein each of the plurality of nodes represents a network, and wherein the chord diagram represents a network of networks.

44. The apparatus of clause 40, wherein each of the plurality of nodes represents a network device, and wherein the chord diagram represents a local network.

45. The apparatus of clause 40, wherein the processor is further configured to generate a visual indicator indicative of a mission-critical problem at a node.

46. The apparatus of clause 40, wherein the processor is further configured to generate a color for each of the plurality of nodes, wherein the color indicates the status of the node.

47. The apparatus of clause 40, wherein the processor is further configured to: receive a selection of a first node; generate a traffic flow of the first node; and generate one or more chords indicative of the traffic flow between the first node and one or more additional nodes.

What is claimed is:

1. A computer-implemented method comprising:
   receiving, by a processor, a plurality of metadata packets corresponding to a plurality of protocol data units, wherein each of the metadata packets comprises a sparse hash value;
   identifying, by the processor, a plurality of matching sparse hash values, wherein the plurality of matching sparse hash values correspond to at least a first protocol data unit and a second protocol data unit; and
   disambiguating, by the processor, the first protocol data unit and the second protocol data unit, wherein the first protocol data unit and the second protocol data unit are disambiguated using metadata associated with the plurality of sparse hash values and using at least one of a protocol data unit location and a protocol data unit trajectory, wherein the first protocol data unit is constrained to a first subset of observation points, wherein the second protocol data unit is constrained to a second subset of observation points, and the first and second subsets of observation points are partially or wholly non-overlapping.

2. The computer-implemented method of claim 1, further comprising:
   comparing, by the processor, each of the plurality of metadata packets;
   identifying, by the processor, the first protocol data unit by identifying a first subset of the plurality of metadata packets comprising matching sparse hash values and at least one invariant field of the associated protocol data unit, wherein the invariant field is used in the calculation of the sparse hash value; and
   identifying, by the processor, the second protocol data unit by identifying a second subset of the plurality of metadata packets comprising matching sparse hash values and at least one invariant field of the associated protocol data unit, wherein the invariant field is used in the calculation of the sparse hash value.

3. The computer-implemented method of claim 2, wherein the metadata associated with the plurality of matching sparse hash values comprises a subset of the invariant field.

4. The computer-implemented method of claim 1, wherein the metadata associated with the plurality of matching sparse hash values comprises a length of the protocol data unit corresponding to the sparse hash value.

5. The computer-implemented method of claim 1, wherein each of the plurality of metadata packets comprises aggregated metadata, wherein the aggregated metadata comprises metadata for each observation point through which the associated protocol data unit has traveled.

6. The computer-implemented method of claim 1, wherein at least one of the plurality of metadata packets comprises at least one of observation point identifier, a timestamp field, and a protocol data unit type.

7. The computer-implemented method of claim 1, wherein disambiguating the first protocol data unit and the second protocol data unit comprises disambiguating using at least one of a protocol data unit type fields source, a destination port, and a length of a protocol data unit.

8. A computer-implemented method comprising:
   receiving, by a processor, a plurality of metadata packets corresponding to a plurality of protocol data units, wherein each of the metadata packets comprises a sparse hash value;
   identifying, by the processor, a plurality of matching sparse hash values, wherein the plurality of matching sparse hash values correspond to at least a first protocol data unit and a second protocol data unit;
   disambiguating, by the processor, the first protocol data unit and the second protocol data unit, wherein the first protocol data unit and the second protocol data unit are disambiguated using metadata associated with the plurality of sparse hash values;
   determining, by the processor, a first existence window for the first protocol data unit;
   comparing, by the processor, a time of arrival of each of the plurality of metadata packets to the first existence window; and
   identifying, by the processor, a subset of the plurality of metadata packets corresponding to the first protocol data unit by identifying one or more metadata packets comprising matching sparse hash values and a time of arrival within the first existence window for the first protocol data unit.

9. A computer-implemented method comprising:
   receiving, by a processor, a plurality of metadata packets corresponding to a plurality of protocol data units, wherein each of the metadata packets comprises a sparse hash value;
   identifying, by the processor, a plurality of matching sparse hash values, wherein the plurality of matching sparse hash values correspond to at least a first protocol data unit and a second protocol data unit;
   disambiguating, by the processor, the first protocol data unit and the second protocol data unit, wherein the first protocol data unit and the second protocol data unit are disambiguated using metadata associated with the plurality of sparse hash values;
   determining, by the processor, a first trajectory for the first protocol data unit;
   comparing, by the processor, a location field for each of the plurality of metadata packets to the first trajectory for the first protocol data unit; and
   identifying, by the processor, a subset of the plurality of metadata packets corresponding to the first protocol data unit by identifying one or more metadata packets comprising matching sparse hash values and the location field corresponding to the first trajectory.

10. An apparatus comprising:
    a processor; and
    a non-transitory computer-readable medium coupled to the processor, the non-transitory computer-readable medium configured to store computer program instructions that when executed by the processor are operable to cause the processor to:
    receive a plurality of metadata packets corresponding to a plurality of protocol data units, wherein each of the metadata packets comprises a sparse hash value;
    identify a plurality of matching sparse hash values, wherein the plurality of matching sparse hash values correspond to at least a first protocol data unit and a second protocol data unit; and disambiguate the first protocol data unit and the second protocol data unit, wherein the first protocol data unit and the second protocol data unit are disambiguated using metadata associated with the plurality of sparse hash values and using at least one of a protocol data unit location and a protocol data unit trajectory, wherein the first protocol data unit is constrained to a first subset of observation points, wherein the second protocol data unit is constrained to a second subset of observation points, and the first and second subsets of observation points are partially or wholly non-overlapping.

11. The apparatus of claim 10, wherein the processor is further configured to:

compare each of the plurality of metadata packets;

identify the first protocol data unit by identifying a first subset of the plurality of metadata packets comprising matching sparse hash values and at least one invariant field of the associated protocol data unit, wherein the invariant field is used in the calculation of the sparse hash value; and identify the second protocol data unit by identifying a second subset of the plurality of metadata packets comprising matching sparse hash values and at least one invariant field of the associated protocol data unit, wherein the invariant field is used in the calculation of the sparse hash value.

12. The apparatus of claim 11, wherein the metadata associated with the plurality of matching sparse hash values comprises a subset of the invariant field.

13. The apparatus according of claim 10, wherein the metadata associated with the plurality of matching sparse hash values comprises a length of the protocol data unit corresponding to the sparse hash value.

14. The apparatus of claim 10, wherein each of the plurality of metadata packets comprises aggregated metadata, wherein the aggregated metadata comprises metadata for each observation point through which the associated protocol data unit has traveled.

15. The apparatus of claim 10, wherein at least one of the plurality of metadata packets comprises at least one of observation point identifier, a timestamp field, and a protocol data unit type.

16. The apparatus of claim 10, wherein the processor is further configured to:

disambiguate the first protocol data unit and the second protocol data unit using at least one of a protocol data unit type fields source, a destination port, and a length of a protocol data unit.

17. An apparatus comprising:

a processor; and a non-transitory computer-readable medium coupled to the processor, the non-transitory computer-readable medium configured to store computer program instructions that when executed by the processor are operable to cause the processor to:

receive a plurality of metadata packets corresponding to a plurality of protocol data units, wherein each of the metadata packets comprises a sparse hash value;

identify a plurality of matching sparse hash values, wherein the plurality of matching sparse hash values correspond to at least a first protocol data unit and a second protocol data unit;

disambiguate the first protocol data unit and the second protocol data unit, wherein the first protocol data unit and the second protocol data unit are disambiguated using metadata associated with the plurality of sparse hash values, determine a first existence window for the first protocol data unit, compare a time of arrival of each of the plurality of metadata packets to the first existence window, and identify a subset of the plurality of metadata packets corresponding to the first protocol data unit by identifying one or more metadata packets comprising matching sparse hash values and a time of arrival within the first existence window for the first protocol data unit.

18. An apparatus comprising:

a processor; and a non-transitory computer-readable medium coupled to the processor, the non-transitory computer-readable medium configured to store computer program instructions that when executed by the processor are operable to cause the processor to:

receive a plurality of metadata packets corresponding to a plurality of protocol data units, wherein each of the metadata packets comprises a sparse hash value;

identify a plurality of matching sparse hash values, wherein the plurality of matching sparse hash values correspond to at least a first protocol data unit and a second protocol data unit;

disambiguate the first protocol data unit and the second protocol data unit, wherein the first protocol data unit and the second protocol data unit are disambiguated using metadata associated with the plurality of sparse hash values, determine a first trajectory for the first protocol data unit, compare a location field for each of the plurality of metadata packets to the first trajectory for the first protocol data unit, and identify a subset of the plurality of metadata packets corresponding to the first protocol data unit by identifying one or more metadata packets comprising matching sparse hash values and the location field corresponding to the first trajectory.

* * * * *